(12) United States Patent
Arackaparambil et al.

(10) Patent No.: US 7,069,101 B1
(45) Date of Patent: Jun. 27, 2006

(54) COMPUTER INTEGRATED MANUFACTURING TECHNIQUES

(75) Inventors: John F. Arackaparambil, San Carlos, CA (US); Tom Chi, San Jose, CA (US); Billy Chow, Menlo Park, CA (US); Patrick M. D'Souza, Mountain View, CA (US); Parris Hawkins, Pleasanton, CA (US); Charles Huang, Union City, CA (US); Jett Jensen, Campbell, CA (US); Badri N. Krishnamurthy, Mountain View, CA (US); Pradeep M. Kulkarni, Sunnyvale, CA (US); Prakash M. Kulkarni, Sunnyvale, CA (US); Wen Fong Lin, San Jose, CA (US); Shantha Mohan, Palo Alto, CA (US); Bishnu Nandy, Union City, CA (US); Huey-Shin Yuan, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/363,966

(22) Filed: Jul. 29, 1999

(51) Int. Cl.
*G06F 19/00* (2006.01)

(52) U.S. Cl. .......................... 700/121; 700/96; 700/115

(58) Field of Classification Search .................. 700/95, 700/96, 97, 99, 103, 104, 108, 109, 121, 700/51, 106, 83, 86, 115; 705/7; 345/964–967
See application file for complete search history.

(56) References Cited

U.S. PATENT DOCUMENTS

| | | | |
|---|---|---|---|
| 3,205,485 A | 9/1965 | Noltingk | |
| 3,229,198 A | 1/1966 | Libby | |
| 3,767,900 A | 10/1973 | Chao et al. | |
| 3,920,965 A | 11/1975 | Sohrwardy | |
| 4,000,458 A | 12/1976 | Miller et al. | |
| 4,207,520 A | 6/1980 | Flora et al. | |
| 4,209,744 A | 6/1980 | Gerasimov et al. | |

(Continued)

FOREIGN PATENT DOCUMENTS

CA    2050247    8/1991

(Continued)

OTHER PUBLICATIONS

W.R. Runyan et al. *Semiconductor Integrated Circuit Processing Technology*, Addison-Wesley Publ. Comp. Inc., p. 48, 1994.

(Continued)

*Primary Examiner*—Leo Picard
*Assistant Examiner*—Steven R. Garland
(74) *Attorney, Agent, or Firm*—Wilmer Cutler Pickering Hale and Dorr

(57) ABSTRACT

The present invention provides a novel distributed factory system framework including a novel factory automation lifecycle (200) having lifecycle activities for SW developing and integrating (210), installing and administrating (220), factory modeling (230), manufacturing planning (240), manufacturing controlling, monitoring and tracking (250) and analyzing of manufacturing results (260). The factory lifecycle comprises framework components. The distributed factory system framework also includes application components and software building blocks. The framework components are adapted for managing the application components, while the application components are utilized to provide instructions for managing a process such as a wafer fab. The building blocks are adapted for forming or modifying framework and application components. The distributed factory system framework provides computer implemented methods for integrating processing systems and facilitates process and equipment changes.

89 Claims, 8 Drawing Sheets

U.S. PATENT DOCUMENTS

| | | | |
|---|---|---|---|
| 4,302,721 A | 11/1981 | Urbanek et al. | |
| 4,368,510 A | 1/1983 | Anderson | |
| 4,609,870 A | 9/1986 | Lale et al. | |
| 4,616,308 A | 10/1986 | Morshedi et al. | |
| 4,663,703 A | 5/1987 | Axelby et al. | |
| 4,698,766 A | 10/1987 | Entwistle et al. | 364/468 |
| 4,750,141 A | 6/1988 | Judell et al. | |
| 4,755,753 A | 7/1988 | Chern | |
| 4,757,259 A | 7/1988 | Charpentier | |
| 4,796,194 A | 1/1989 | Atherton | 364/468 |
| 4,901,218 A | 2/1990 | Cornwell | |
| 4,938,600 A | 7/1990 | Into | |
| 4,957,605 A | 9/1990 | Hurwitt et al. | |
| 4,967,381 A | 10/1990 | Lane et al. | 364/551.01 |
| 5,089,970 A | 2/1992 | Lee et al. | 364/468 |
| 5,108,570 A | 4/1992 | Wang | 204/192.3 |
| 5,208,765 A | 5/1993 | Turnbull | 364/552 |
| 5,220,517 A | 6/1993 | Sierk et al. | 364/550 |
| 5,226,118 A | 7/1993 | Baker et al. | 395/161 |
| 5,231,585 A | 7/1993 | Kobayashi et al. | 364/468 |
| 5,236,868 A | 8/1993 | Nulman | 437/190 |
| 5,240,552 A | 8/1993 | Yu et al. | |
| 5,260,868 A | 11/1993 | Gupta et al. | 364/402 |
| 5,270,222 A | 12/1993 | Moslehi | |
| 5,283,141 A | 2/1994 | Yoon et al. | |
| 5,295,242 A | 3/1994 | Mashruwala et al. | 395/159 |
| 5,309,221 A | 5/1994 | Fischer et al. | 356/355 |
| 5,329,463 A | 7/1994 | Sierk et al. | 364/510 |
| 5,338,630 A | 8/1994 | Yoon et al. | |
| 5,347,446 A | 9/1994 | Iino et al. | |
| 5,367,624 A | 11/1994 | Cooper | 395/157 |
| 5,369,544 A | 11/1994 | Mastrangelo | |
| 5,375,064 A | 12/1994 | Bollinger | |
| 5,398,336 A | 3/1995 | Tantry et al. | 395/600 |
| 5,402,367 A | 3/1995 | Sullivan et al. | 364/578 |
| 5,408,405 A | 4/1995 | Mozumder et al. | 364/151 |
| 5,410,473 A | 4/1995 | Kaneko et al. | 354/413.06 |
| 5,420,796 A | 5/1995 | Weling et al. | 364/468 |
| 5,427,878 A | 6/1995 | Corliss | |
| 5,444,837 A | 8/1995 | Bomans et al. | |
| 5,469,361 A | 11/1995 | Moyne | 364/468 |
| 5,485,082 A | 1/1996 | Wisspeintner et al. | |
| 5,490,097 A | 2/1996 | Swenson et al. | 364/578 |
| 5,495,417 A | 2/1996 | Fuduka et al. | 364/468 |
| 5,497,316 A | 3/1996 | Sierk et al. | 364/140 |
| 5,497,381 A | 3/1996 | O'Donoghue et al. | |
| 5,503,707 A | 4/1996 | Maung et al. | 156/626.1 |
| 5,508,947 A | 4/1996 | Sierk et al. | 364/571.01 |
| 5,511,005 A | 4/1996 | Abbe et al. | |
| 5,519,605 A | 5/1996 | Cawlfield | |
| 5,525,808 A | 6/1996 | Irie et al. | 250/548 |
| 5,526,293 A | 6/1996 | Mozumder et al. | |
| 5,534,289 A | 7/1996 | Bilder et al. | |
| 5,541,510 A | 7/1996 | Danielson | |
| 5,546,312 A | 8/1996 | Mozumder et al. | |
| 5,553,195 A | 9/1996 | Meijer | |
| 5,586,039 A | 12/1996 | Hirsch et al. | 364/468.01 |
| 5,599,423 A | 2/1997 | Parker et al. | |
| 5,602,492 A | 2/1997 | Cresswell et al. | |
| 5,603,707 A | 2/1997 | Trombetta et al. | 604/383 |
| 5,617,023 A | 4/1997 | Skalski | |
| 5,627,083 A | 5/1997 | Tounai | |
| 5,629,216 A | 5/1997 | Wijaranakula et al. | 438/502 |
| 5,642,296 A | 6/1997 | Saxena | |
| 5,646,870 A | 7/1997 | Krivokapic et al. | |
| 5,649,169 A | 7/1997 | Berezin et al. | |
| 5,654,903 A | 8/1997 | Reitman et al. | |
| 5,655,951 A | 8/1997 | Meikle et al. | 451/56 |
| 5,657,254 A | 8/1997 | Sierk et al. | 364/571.05 |
| 5,661,669 A | 8/1997 | Mozumder et al. | 364/552 |
| 5,663,797 A | 9/1997 | Sandhu | |
| 5,664,987 A | 9/1997 | Renteln | 451/21 |
| 5,665,199 A | 9/1997 | Sahota et al. | |
| 5,665,214 A | 9/1997 | Iturralde | |
| 5,666,297 A | 9/1997 | Britt et al. | |
| 5,667,424 A | 9/1997 | Pan | |
| 5,674,787 A | 10/1997 | Zhao et al. | |
| 5,694,325 A | 12/1997 | Fukuda et al. | 364/468.28 |
| 5,695,810 A | 12/1997 | Dubin et al. | |
| 5,698,989 A | 12/1997 | Nulman | 324/719 |
| 5,719,495 A | 2/1998 | Moslehi | 324/158.1 |
| 5,719,796 A | 2/1998 | Chen | |
| 5,735,055 A | 4/1998 | Hochbein et al. | |
| 5,740,429 A | 4/1998 | Wang et al. | 395/615 |
| 5,751,582 A | 5/1998 | Saxena et al. | 364/468.16 |
| 5,754,297 A | 5/1998 | Nulman | 366/381 |
| 5,761,064 A | 6/1998 | La et al. | |
| 5,761,065 A | 6/1998 | Kittler et al. | |
| 5,764,543 A | 6/1998 | Kennedy | 364/578 |
| 5,777,901 A | 7/1998 | Berezin et al. | |
| 5,787,021 A | 7/1998 | Samaha | |
| 5,787,269 A | 7/1998 | Hyodo | |
| 5,808,303 A | 9/1998 | Schlagheck et al. | 250/330 |
| 5,812,407 A | 9/1998 | Sato et al. | 364/474.35 |
| 5,823,854 A | 10/1998 | Chen | 451/9 |
| 5,824,599 A | 10/1998 | Schacham-Diamand et al. | |
| 5,825,356 A | 10/1998 | Habib et al. | |
| 5,825,913 A | 10/1998 | Rostami et al. | |
| 5,828,778 A | 10/1998 | Hagi et al. | 382/145 |
| 5,831,851 A | 11/1998 | Eastburn et al. | |
| 5,832,224 A | 11/1998 | Fehskens et al. | 395/200.53 |
| 5,838,595 A | 11/1998 | Sullivan et al. | 364/578 |
| 5,838,951 A | 11/1998 | Song | |
| 5,844,554 A | 12/1998 | Geller et al. | |
| 5,857,258 A | 1/1999 | Penzes et al. | |
| 5,859,777 A | 1/1999 | Yokoyama et al. | |
| 5,859,964 A | 1/1999 | Wang et al. | 395/185.01 |
| 5,859,975 A | 1/1999 | Brewer et al. | 395/200.43 |
| 5,862,054 A | 1/1999 | Li | |
| 5,863,807 A | 1/1999 | Jang et al. | 438/14 |
| 5,867,389 A | 2/1999 | Hamada et al. | |
| 5,870,306 A | 2/1999 | Harada | 364/474.11 |
| 5,871,805 A | 2/1999 | Lemelson | |
| 5,883,437 A | 3/1999 | Maruyama et al. | 257/773 |
| 5,889,991 A | 3/1999 | Consolatti et al. | |
| 5,901,313 A | 5/1999 | Wolf et al. | |
| 5,903,455 A | 5/1999 | Sharpe, Jr. et al. | 364/188 |
| 5,910,011 A | 6/1999 | Cruse | 438/16 |
| 5,910,846 A | 6/1999 | Sandhu | |
| 5,912,678 A | 6/1999 | Saxena et al. | |
| 5,916,016 A | 6/1999 | Bothra | 451/398 |
| 5,923,553 A | 7/1999 | Yi | 364/468.17 |
| 5,926,690 A | 7/1999 | Toprac et al. | |
| 5,930,138 A | 7/1999 | Lin et al. | 364/468.15 |
| 5,940,300 A | 8/1999 | Ozaki | 364/468.28 |
| 5,943,237 A | 8/1999 | Van Boxem | |
| 5,943,550 A | 8/1999 | Fulford, Jr. et al. | |
| 5,960,185 A | 9/1999 | Nguyen | |
| 5,960,214 A | 9/1999 | Sharpe, Jr. et al. | 395/835 |
| 5,961,369 A | 10/1999 | Bartels et al. | |
| 5,963,881 A | 10/1999 | Kahn et al. | 701/35 |
| 5,975,994 A | 11/1999 | Sandhu et al. | |
| 5,978,751 A | 11/1999 | Pence et al. | |
| 5,982,920 A | 11/1999 | Tobin, Jr. et al. | 382/145 |
| 6,002,989 A | 12/1999 | Shiba et al. | |
| 6,012,048 A | 1/2000 | Gustin et al. | |
| 6,017,771 A | 1/2000 | Yang et al. | |
| 6,036,349 A | 3/2000 | Gombar | |
| 6,037,664 A | 3/2000 | Zhao et al. | |
| 6,041,263 A | 3/2000 | Boston et al. | |
| 6,041,270 A | 3/2000 | Steffan et al. | 700/121 |
| 6,054,379 A | 4/2000 | Yau et al. | 438/623 |
| 6,059,636 A | 5/2000 | Inaba et al. | |
| 6,064,759 A | 5/2000 | Buckley et al. | |

| Patent | Kind | Date | Inventor | Class |
|---|---|---|---|---|
| 6,072,313 | A | 6/2000 | Li et al. | |
| 6,074,443 | A | 6/2000 | Venkatesh et al. | |
| 6,077,412 | A | 6/2000 | Ting et al. | |
| 6,078,845 | A | 6/2000 | Friedman | 700/104 |
| 6,094,688 | A | 7/2000 | Mellen-Garnett et al. | |
| 6,096,649 | A | 8/2000 | Jang | |
| 6,097,887 | A | 8/2000 | Hardikar et al. | |
| 6,100,195 | A | 8/2000 | Chan et al. | |
| 6,108,092 | A | 8/2000 | Sandhu | |
| 6,111,634 | A | 8/2000 | Pecen et al. | |
| 6,112,130 | A | 8/2000 | Fukuda et al. | 700/121 |
| 6,113,462 | A | 9/2000 | Yang | |
| 6,114,238 | A | 9/2000 | Liao | |
| 6,127,263 | A | 10/2000 | Parikh | |
| 6,128,016 | A | 10/2000 | Coelho et al. | |
| 6,136,163 | A | 10/2000 | Cheung et al. | |
| 6,141,660 | A | 10/2000 | Bach et al. | |
| 6,143,646 | A | 11/2000 | Wetzel | |
| 6,148,099 | A | 11/2000 | Lee et al. | |
| 6,148,239 | A | 11/2000 | Funk et al. | |
| 6,148,246 | A | 11/2000 | Kawazome | 700/121 |
| 6,150,270 | A | 11/2000 | Matsuda et al. | |
| 6,157,864 | A | 12/2000 | Schwenke et al. | |
| 6,159,075 | A | 12/2000 | Zhang | |
| 6,159,644 | A | 12/2000 | Satoh et al. | |
| 6,161,054 | A | 12/2000 | Rosenthal et al. | |
| 6,169,931 | B1 | 1/2001 | Runnels | |
| 6,172,756 | B1 | 1/2001 | Chalmers et al. | |
| 6,173,240 | B1 | 1/2001 | Sepulveda et al. | |
| 6,175,777 | B1 | 1/2001 | Kim | 700/121 |
| 6,178,390 | B1 | 1/2001 | Jun | 702/170 |
| 6,181,013 | B1 | 1/2001 | Liu et al. | |
| 6,183,345 | B1 | 2/2001 | Kamono et al. | |
| 6,185,324 | B1 | 2/2001 | Ishihara et al. | 382/149 |
| 6,191,864 | B1 | 2/2001 | Sandhu | |
| 6,192,291 | B1 | 2/2001 | Kwon | 700/121 |
| 6,197,604 | B1 | 3/2001 | Miller et al. | 438/14 |
| 6,204,165 | B1 | 3/2001 | Ghoshal | |
| 6,210,983 | B1 | 4/2001 | Atchison et al. | |
| 6,211,094 | B1 | 4/2001 | Jun et al. | 438/758 |
| 6,212,961 | B1 | 4/2001 | Dvir | |
| 6,214,734 | B1 | 4/2001 | Bothra et al. | |
| 6,217,412 | B1 | 4/2001 | Campbell et al. | |
| 6,219,711 | B1 | 4/2001 | Chari | |
| 6,222,936 | B1 | 4/2001 | Phan et al. | |
| 6,226,563 | B1 | 5/2001 | Lim | |
| 6,226,792 | B1 | 5/2001 | Goiffon et al. | 717/11 |
| 6,228,280 | B1 | 5/2001 | Li et al. | |
| 6,230,069 | B1 | 5/2001 | Campbell et al. | 700/121 |
| 6,236,903 | B1 | 5/2001 | Kim et al. | 700/121 |
| 6,237,050 | B1 | 5/2001 | Kim et al. | |
| 6,240,330 | B1 | 5/2001 | Kurtzberg et al. | 700/121 |
| 6,240,331 | B1 | 5/2001 | Yun | 700/121 |
| 6,245,581 | B1 | 6/2001 | Bonser et al. | |
| 6,246,972 | B1 | 6/2001 | Klimasauskas | |
| 6,248,602 | B1 | 6/2001 | Bode et al. | 438/14 |
| 6,249,712 | B1 | 6/2001 | Boiquaye | |
| 6,252,412 | B1 | 6/2001 | Talbot et al. | 324/750 |
| 6,253,366 | B1 | 6/2001 | Mutschler, III | |
| 6,259,160 | B1 | 7/2001 | Lopatin et al. | |
| 6,263,255 | B1 * | 7/2001 | Tan et al. | 700/121 |
| 6,268,270 | B1 | 7/2001 | Scheid et al. | |
| 6,271,670 | B1 | 8/2001 | Caffey | |
| 6,276,989 | B1 | 8/2001 | Campbell et al. | |
| 6,277,014 | B1 | 8/2001 | Chen et al. | |
| 6,278,899 | B1 | 8/2001 | Piche et al. | |
| 6,280,289 | B1 | 8/2001 | Wiswesser et al. | |
| 6,281,127 | B1 | 8/2001 | Shue | |
| 6,284,622 | B1 | 9/2001 | Campbell et al. | |
| 6,287,879 | B1 | 9/2001 | Gonzales et al. | |
| 6,290,572 | B1 | 9/2001 | Hofmann | |
| 6,291,367 | B1 | 9/2001 | Kelkar | |
| 6,292,708 | B1 | 9/2001 | Allen et al. | 700/121 |
| 6,298,274 | B1 | 10/2001 | Inoue | 700/112 |
| 6,298,470 | B1 | 10/2001 | Breiner et al. | |
| 6,303,395 | B1 | 10/2001 | Nulman | 438/14 |
| 6,304,999 | B1 | 10/2001 | Toprac et al. | |
| 6,307,628 | B1 | 10/2001 | Lu et al. | |
| 6,314,379 | B1 | 11/2001 | Hu et al. | |
| 6,317,643 | B1 | 11/2001 | Dmochowski | |
| 6,320,655 | B1 | 11/2001 | Matsushita et al. | |
| 6,324,481 | B1 | 11/2001 | Atchison et al. | |
| 6,334,807 | B1 | 1/2002 | Lebel et al. | |
| 6,336,841 | B1 | 1/2002 | Chang | |
| 6,339,727 | B1 | 1/2002 | Ladd | |
| 6,340,602 | B1 | 1/2002 | Johnson et al. | |
| 6,345,288 | B1 | 2/2002 | Reed et al. | |
| 6,345,315 | B1 | 2/2002 | Mishra | 709/329 |
| 6,346,426 | B1 | 2/2002 | Toprac et al. | |
| 6,355,559 | B1 | 3/2002 | Havemann et al. | |
| 6,360,133 | B1 | 3/2002 | Campbell et al. | |
| 6,360,184 | B1 | 3/2002 | Jacquez | |
| 6,363,294 | B1 | 3/2002 | Coronel et al. | |
| 6,366,934 | B1 | 4/2002 | Cheng et al. | 707/513 |
| 6,368,879 | B1 | 4/2002 | Toprac | |
| 6,368,883 | B1 | 4/2002 | Bode et al. | |
| 6,368,884 | B1 | 4/2002 | Goodwin et al. | |
| 6,379,980 | B1 | 4/2002 | Toprac | |
| 6,381,564 | B1 | 4/2002 | David et al. | |
| 6,388,253 | B1 | 5/2002 | Su | |
| 6,389,491 | B1 | 5/2002 | Jacobson et al. | 710/62 |
| 6,391,780 | B1 | 5/2002 | Shih et al. | |
| 6,395,152 | B1 | 5/2002 | Wang | |
| 6,397,114 | B1 | 5/2002 | Eryurek et al. | |
| 6,400,162 | B1 | 6/2002 | Mallory et al. | |
| 6,405,096 | B1 | 6/2002 | Toprac et al. | |
| 6,405,144 | B1 | 6/2002 | Toprac et al. | |
| 6,417,014 | B1 | 7/2002 | Lam et al. | |
| 6,427,093 | B1 | 7/2002 | Toprac | |
| 6,432,728 | B1 | 8/2002 | Tai et al. | |
| 6,435,952 | B1 | 8/2002 | Boyd et al. | |
| 6,438,438 | B1 | 8/2002 | Takagi et al. | |
| 6,440,295 | B1 | 8/2002 | Wang | |
| 6,442,496 | B1 | 8/2002 | Pasadyn et al. | |
| 6,449,524 | B1 | 9/2002 | Miller et al. | |
| 6,455,415 | B1 | 9/2002 | Lopatin et al. | |
| 6,455,937 | B1 | 9/2002 | Cunningham | |
| 6,465,263 | B1 | 10/2002 | Coss, Jr. et al. | |
| 6,470,230 | B1 | 10/2002 | Toprac et al. | |
| 6,479,902 | B1 | 11/2002 | Lopatin et al. | |
| 6,479,990 | B1 | 11/2002 | Mednikov et al. | |
| 6,482,660 | B1 | 11/2002 | Conchieri et al. | |
| 6,484,064 | B1 | 11/2002 | Campbell | |
| 6,486,492 | B1 | 11/2002 | Su | |
| 6,492,281 | B1 | 12/2002 | Song et al. | |
| 6,495,452 | B1 | 12/2002 | Shih | |
| 6,503,839 | B1 | 1/2003 | Gonzales et al. | |
| 6,515,368 | B1 | 2/2003 | Lopatin et al. | |
| 6,517,413 | B1 | 2/2003 | Hu et al. | |
| 6,517,414 | B1 | 2/2003 | Tobin et al. | |
| 6,528,409 | B1 | 3/2003 | Lopatin et al. | |
| 6,529,789 | B1 * | 3/2003 | Campbell et al. | 700/115 |
| 6,532,555 | B1 | 3/2003 | Miller et al. | |
| 6,535,783 | B1 | 3/2003 | Miller et al. | |
| 6,537,912 | B1 | 3/2003 | Agarwal | |
| 6,540,591 | B1 | 4/2003 | Pasadyn et al. | |
| 6,541,401 | B1 | 4/2003 | Herner et al. | |
| 6,546,508 | B1 | 4/2003 | Sonderman et al. | |
| 6,556,881 | B1 | 4/2003 | Miller | |
| 6,560,504 | B1 | 5/2003 | Goodwin et al. | |
| 6,563,308 | B1 | 5/2003 | Nagano et al. | |
| 6,567,717 | B1 | 5/2003 | Krivokapic et al. | |
| 6,580,958 | B1 | 6/2003 | Takano | |
| 6,587,744 | B1 | 7/2003 | Stoddard et al. | |
| 6,590,179 | B1 | 7/2003 | Tanaka et al. | |
| 6,604,012 | B1 | 8/2003 | Cho et al. | |

| | | | | | | |
|---|---|---|---|---|---|---|
| 6,605,549 | B1 | 8/2003 | Leu et al. | EP | 1 182526 A2 | 2/2002 |
| 6,607,976 | B1 | 8/2003 | Chen et al. | GB | 2 347 885 A | 9/2000 |
| 6,609,946 | B1 | 8/2003 | Tran | GB | 2 365 215 A | 2/2002 |
| 6,616,513 | B1 | 9/2003 | Osterheld | JP | 61-66104 | 4/1986 |
| 6,618,692 | B1 | 9/2003 | Takahashi et al. | JP | 61-171147 | 8/1986 |
| 6,624,075 | B1 | 9/2003 | Lopatin et al. | JP | HEI 1-283934 | 11/1989 |
| 6,625,497 | B1 | 9/2003 | Fairbairn et al. | JP | 3-202710 | 9/1991 |
| 6,630,741 | B1 | 10/2003 | Lopatin et al. | JP | 05-151231 | 6/1993 |
| 6,640,151 | B1 | 10/2003 | Somekh et al. | JP | 05-216896 | 8/1993 |
| 6,652,355 | B1 | 11/2003 | Wiswesser et al. | JP | 05-266029 | 10/1993 |
| 6,660,633 | B1 | 12/2003 | Lopatin et al. | JP | 06-110894 | 4/1994 |
| 6,678,570 | B1 | 1/2004 | Pasadyn et al. | JP | 06-176994 | 6/1994 |
| 6,708,074 | B1 | 3/2004 | Chi et al. | JP | 6-184434 | 7/1994 |
| 6,708,075 | B1 | 3/2004 | Sonderman et al. | JP | 06-252236 | 9/1994 |
| 6,725,402 | B1 | 4/2004 | Coss, Jr. et al. | JP | 06-260380 | 9/1994 |
| 6,728,587 | B1 | 4/2004 | Goldman et al. | JP | 8-23166 | 1/1996 |
| 6,735,492 | B1 | 5/2004 | Conrad et al. | JP | 8-50161 | 2/1996 |
| 6,751,518 | B1 | 6/2004 | Sonderman et al. | JP | HEI 8-149583 | 6/1996 |
| 6,774,998 | B1 | 8/2004 | Wright et al. | JP | 8-304023 | 11/1996 |
| 2001/0001755 | A1 | 5/2001 | Sandhu et al. | JP | HEI 9-34535 | 2/1997 |
| 2001/0003084 | A1 | 6/2001 | Finarov | JP | 9-246547 | 9/1997 |
| 2001/0006873 | A1 | 7/2001 | Moore | JP | 10-34522 | 2/1998 |
| 2001/0030366 | A1 | 10/2001 | Nakano et al. | JP | 10-173029 | 6/1998 |
| 2001/0039462 | A1 | 11/2001 | Mendez et al. | JP | 11-126816 | 5/1999 |
| 2001/0040997 | A1 | 11/2001 | Tsap et al. | JP | 11-135601 | 5/1999 |
| 2001/0042690 | A1 | 11/2001 | Talieh | JP | HEI 11-67853 | 7/1999 |
| 2001/0044667 | A1 | 11/2001 | Nakano et al. | JP | 2000-183001 | 6/2000 |
| 2002/0032499 | A1 | 3/2002 | Wilson et al. | JP | 2001-76982 | 3/2001 |
| 2002/0058460 | A1 | 5/2002 | Lee et al. | JP | 2001-284299 | 10/2001 |
| 2002/0070126 | A1 | 6/2002 | Sato et al. | JP | 2001-305108 | 10/2001 |
| 2002/0077031 | A1 | 6/2002 | Johansson et al. | JP | 2002-9030 | 1/2002 |
| 2002/0081951 | A1 | 6/2002 | Boyd et al. | JP | 2002-343754 | 11/2002 |
| 2002/0089676 | A1 | 7/2002 | Pecen et al. | TW | 434103 | 5/2001 |
| 2002/0102853 | A1 | 8/2002 | Li et al. | TW | 436383 | 5/2001 |
| 2002/0107599 | A1 | 8/2002 | Patel et al. | TW | 455938 | 9/2001 |
| 2002/0107604 | A1 | 8/2002 | Riley et al. | TW | 455976 | 9/2001 |
| 2002/0113039 | A1 | 8/2002 | Mok et al. | WO | WO 98/05066 | 2/1998 |
| 2002/0127950 | A1 | 9/2002 | Hirose et al. | WO | WO 98/45090 | 10/1998 |
| 2002/0128805 | A1 | 9/2002 | Goldman et al. | WO | WO 99/09371 | 2/1999 |
| 2002/0149359 | A1 | 10/2002 | Crouzen et al. | WO | WO 99/25520 | 5/1999 |
| 2002/0165636 | A1 | 11/2002 | Hasan | WO | WO 99/59200 | 11/1999 |
| 2002/0183986 | A1 | 12/2002 | Stewart et al. | WO | WO 95/34866 | 12/1999 |
| 2002/0185658 | A1 | 12/2002 | Inoue et al. | WO | WO 00/00874 | 1/2000 |
| 2002/0193899 | A1 | 12/2002 | Shanmugasundram et al. | WO | WO 00/05759 | 2/2000 |
| 2002/0193902 | A1 | 12/2002 | Shanmugasundram et al. | WO | WO 00/35063 | 6/2000 |
| 2002/0197745 | A1 | 12/2002 | Shanmugasundram et al. | WO | WO 00/54325 | 9/2000 |
| 2002/0197934 | A1 | 12/2002 | Paik | WO | WO 00/79355 A1 | 12/2000 |
| 2002/0199082 | A1 | 12/2002 | Shanmugasundram et al. | WO | WO 01/11679 | 2/2001 |
| 2003/0017256 | A1 | 1/2003 | Shimane | WO | WO 01/15865 A1 | 3/2001 |
| 2003/0020909 | A1 | 1/2003 | Adams et al. | WO | WO 01/18623 | 3/2001 |
| 2003/0020928 | A1 | 1/2003 | Ritzdorf et al. | WO | WO 01/25865 | 4/2001 |
| 2003/0154062 | A1 | 8/2003 | Daft et al. | WO | WO 01/33277 | 5/2001 |
| | | | | WO | WO 01/33501 A1 | 5/2001 |
| | | FOREIGN PATENT DOCUMENTS | | WO | WO 01/52055 A3 | 7/2001 |
| CA | | 2165847 | 8/1991 | WO | WO 01/52319 | 7/2001 |
| CA | | 2194855 | 8/1991 | WO | WO 01/57823 A2 | 8/2001 |
| EP | | 0 397 924 A1 | 11/1990 | WO | WO 01/080306 | 10/2001 |
| EP | | 0 621 522 A2 | 10/1994 | WO | WO 02/17150 A1 | 2/2002 |
| EP | | 0 747 795 A2 | 12/1996 | WO | WO 02/31613 A2 | 4/2002 |
| EP | | 0 869 652 | 10/1998 | WO | WO 02/31613 A3 | 4/2002 |
| EP | | 0877308 A | 11/1998 | WO | WO 02/33737 A2 | 4/2002 |
| EP | | 0 881 040 A2 | 12/1998 | WO | WO 01/074491 | 9/2002 |
| EP | | 0 895 145 A1 | 2/1999 | | | |
| EP | | 0 910 123 | 4/1999 | | | |
| EP | | 0 932 194 | 7/1999 | | | |
| EP | | 0 932 195 A1 | 7/1999 | | | |
| EP | | 1 066 925 A2 | 1/2001 | | | |
| EP | | 1 067 757 | 1/2001 | | | |
| EP | | 1 083 470 A2 | 3/2001 | | | |
| EP | | 1 092 505 A2 | 4/2001 | | | |
| EP | | 1072967 A3 | 11/2001 | | | |
| EP | | 1 071 128 | 1/2002 | | | |

OTHER PUBLICATIONS

Peter van Zandt, *Microchip Fabrication*, 3rd ed., McGraw-Hill, pp. 472-478, 1997.

R. Zorich, *Handbook Of Quality Integrated Circuit Manufacturing*, Academic Press Inc., pp. 464-498, 1991.

SEMI E10-96, *Standard For Definition And Measurement Of Equipment Reliability And Maintainability (RAM)*, published by Semiconductor Equipment and Materials International (SEMI), pp. 1-23, 1996.

SEMI Draft Doc. 2817, *New Standard: Provisional Specification for CIM Framework Domain Architecture*, published by Semiconductor Equipment and materials International (SEMI), pp. 1-53, 1998.

Prasad Rampalli et al., "CEPT—A Computer-Aided Manufacturing Application for Managing Equipment Reliability and Availability in the Semi-Conductor Industry", IEE Transactions on Components, Hybrids, and Manufacturing Technology, IEEE Inc. New York, vol. 14, No. 3, pp. 499-506, (1991).

Moyne, James R., Nauman Chaudhry, and Roland Telfeyan. 1995. "Adaptive Extensions to a Multi-Branch Run-to-Run Controller for Plasma Etching." *Journal of Vacuum Science and Technology*. Ann Arbor, Michigan: University of Michigan Display Technology Manufacturing Center, pp 1-12, 1995.

Moyne, James, Roland Telfeyan, Arnon Hurwitz, and John Taylor. Aug. 1995. "A Process-Independent Run-to-Run Controller and Its Application to Chemical-Mechanical Planarization." *SEMI/IEEE Advanced Semiconductor Manufacturing Conference and Workshop*. Ann Arbor, Michigan: The University of Michigan, Electrical Engineering & Computer Science Center for Display Technology & Manufacturing. pp 1-21, Aug. 15, 1995.

Dishon. G., M. Finarov, R. Kipper, J.W. Curry, T. Schraub, D. Trojan, 4th Stambaugh, Y. Li and J. Ben-Jacob. Feb. 1996, "On-Line Integrated Metrology for CMP Processing." Santa Clara, California: VMIC Speciality Conference, 1st International CMP Planarization Conference, pp 1-6, Feb. 1996.

Campbell, W. Jarrett, and Anthony J. Toprac. Feb. 11-12, 1998. "Run-to-Run Control in Microelectronics Manufacturing." Advanced Micro Devises, TWMCC, pp 1-15, Feb. 11, 1998.

Consilium. Aug. 1998. *Quality Management Component: QMC™ and QMC-Link™ Overview*. Mountain View, California: Consilium, Inc.

Consilium. 1998, *FAB300™*, Mountain View, California: Consilium, Inc.

Khan, Kareemullah, Victor Solakhain, Anthony Ricci, Tier Gu, and James Moyne. 1998. "Run-to-Run Control of ITO Deposition Process." Ann Arbor, Michigan.

Moyne, James amd John Curry. Jun. 1998. "A Fully Automated Chemical-Mechanical Planarization Process."

Consilium. Jul. 1999. "Increasing Overall Equipment Effectiveness (OEE) in Fab Manufacturing by Implementing Consilium's Next-Generation Mauufacturing Execution System—MES II." Semiconductor Fabtech Edition 10.

Consilium Corporate Brochure. Oct. 1999. www.consilium.com.

Consilium. Jan. 1999. "FAB300™: Consilium's Next Generation MES Solution of Software and Services which Control and Automatic Real-Time FAB Operations." www.consilium.com/products/fab300_page.htm#300 Introduction.

Consilium. Nov. 1999. *FAB300™ Update*.

SEMI. 2000. "Provisional Specification for CIM Framework Scheduling Component." San Jose, California. SEMI E105-1000, 2000.

Oct. 15, 2002. International Search Report prepared by the European Patent Office for PCT/US02/19062.

Communication Pursuant to Article 96(2) EPC for European Patent Application No. 00 115 577.9. Jul. 23, 2002.

Feb. 1984. "Method and Apparatus of in Situ Measurement and Overlay Error Analysis for Correcting Step and Repeat Lithographic Cameras." *IBM Technical Disclosure Bulletin*, pp. 4855-4859.

Oct. 1984. "Method to Characterize the Stability of a Step and Repeat Lithographic System." *IBM Technical Disclosure Bulletin*, pp. 2857-2860.

Schmid, Hans Albrecht. 1995 "Creating the Architecture of a Manufacturing Framework by Design Patterns." Austin, Texas: OOPSLA.

Baliga, John. Jul. 1999. "Advanced Process Control: Soon to be a Must." Cahners Semiconductor International. www.semiconductor.net/semiconductor.issues/issues/1999/jul99/docs/feature1.asp.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07.shtml.

Oct. 15, 2001. Search Report prepared by the Austrian Patent Office for Singapore Patent Application No. 200004286-1.

Johnson, Bob. Jun. 10, 2002. "Advanced Process Control Key to Moore's Law." Gartner, Inc.

Jul. 9, 2002. International Search Report prepared by the European Patent Office for PCT/US01/24910.

Jul. 29, 2002. International Search Report prepared by the European Patent Office for PCT/US01/27407.

Sonderman, Thomas. 2002. "APC as a Competitive Manufacturing Technology: *AMD's Vision for 300mm*." AEC/APC.

Zhou, Zhen-Hong and Rafael Reif. Aug. 1995. "Epi-Film Thickness Measurements Using Emission Fourier Transform Infrared Spectroscopy—Part II: Real-Time in Situ Process Monitoring and Control." IEEE Transactions on Semiconductor Manufacturing, vol. 8, No. 3.

Telfeyan, Roland, James Moyne, Nauman Chaudhry, James Pugmire, Scott Shellman, Duane Boning, William Moyne, Arnon Hurwitz, and John Taylor. Oct. 1995. "A Multi-Level Approach to the Control of a Chemical-Mechanical Planarization Process." Minneapolis, Minnesota: 42nd National Symposium of the American Vacuum Society.

Chang, E., B. Stine, T. Maung, R. Divecha, D. Boning, J. Chung, K. Chang, G. Ray, D. Bradbury, O.S. Nakagawa, S. Oh, and D. Bartelink. Dec. 1995. "Using a Statistical Metrology Framework to Identify Systematic and Random Sources of Die- and Wafer-level ILD Thickness Variation in CMP Processes." Washington, D.C.: International Electron Devices Meeting.

Smith, Taber, Duane Boning, James Moyne, Arnon Hurwitz, and John Curry. Jun. 1996. "Compensating for CMP Pad Wear Using Run by Run Feedback Control." Santa Clara, California: VLSI Multilevel Interconnect Conference.

Boning, Duane, William Moyne, Tabor Smith, James Moyne, Roland Telfeyan, Arnon Hurwitz, Scott Shellman, and John Taylor. Oct. 1996. "Run by Run Control of Chemical-Mechanical Polishing." *IEEE Trans. CPMT (C)*, vol. 19, No. 4, pp. 307-314.

Edgar, Thomas F., Stephanie W. Butler, Jarrett Campbell, Carlos Pfeiffer, Chris Bode, Sung Bo. Hwang, and K.S. Balakrishnan. May 1998. "Automatic Control in Microelectronics Manufacturing: Practices, Challenges, and Possibilities." Automatica, vol. 36, pp. 1567-1603, 2000.

Chemali, Chadi El, James Moyne, Kareemullah Khan, Rock Nadeau, Paul Smith, John Colt, Jonathan Chapple-Sokol, and Tarun Parikh. Nov. 1998. "Multizone Uniformity Control of a CMP Process Utilizing a Pre and Post-Measurement Strategy." Seattle, Washington: SEMETECH Symposium.

Moyne, James. Oct. 1999. "Advancements in CMP Process Automation and Control." Hawaii: (Invited paper and presentation to) Third International Symposium on Chemical Mechanical Polishing in IC Device Manufacturing: 196th Meeting of the Electrochemical Society.

Lee, Brian, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meetings, 2001.

NovaScan 2020. Printed Feb. 2002. "Superior Integrated Process Control for Emerging CMP High-End Applications."

Ostanin, Yu.Ya. Oct. 1981. "Optimization of Thickness Inspection of Electrically Conductive Single-Layer Coatings with Laid-on Eddy-Current Transducers (Abstract)." *Defektoskopiya*, vol. 17, No. 10, pp. 45-52. Moscow, USSR.

Feb. 1984. "Substrate Screening Process." *IBM Technical Disclosure Bulletin*, pp. 4824-4825.

Herrmann, D. 1988. "Temperature Errors and Ways of Elimination for Contactless Measurement of Shaft Vibrations (Abstract)." *Technisches Messen™*, vol. 55, No. 1, pp. 27-30. West Germany.

Lin, Kuang-Kuo and Costas J. Spanos. Nov. 1990. "Statistical Equipment Modeling for VLSI Manufacturing: An Application for LPCVD." *IEEE Transactions on Semiconductor Manufacturing*, v. 3, n. 4, pp. 216-229.

Chang, Norman H. and Costas J. Spanos. Feb. 1991. "Continuous Equipment Diagnosis Using Evidence Integration: An LPCVD Application." *IEEE Transactions on Semiconductor Manufacturing*, v. 4, n. 1, pp. 43-51.

Larrabee, G. B. May 1991. "The Intelligent Microelectronics Factory of the Future (Abstract)." *IEEE/SEMI International Semiconductor Manufacturing Science Symposium*, pp. 30-34. Burlingame, CA.

Burke, Peter A. Jun. 1991. "Semi-Empirical Modeling of SiO2 Chemical-Mechanical Polishing Planarization." *VMIC Conference, 1991 IEEE*, pp. 379-384. IEEE.

May 1992. "Laser Ablation Endpoint Detector." *IBM Technical Disclosure Bulletin*, pp. 333-334.

Spanos, Costas J., Hai-Fang Guo, Alan Miller, and Joanne Levine-Parrill. Nov. 1992. "Real-Time Statistical Process Control Using Tool Data." *IEEE Transactions on Semiconductor Manufacturing*, v. 5, n. 4, pp. 308-318.

Feb. 1993. "Electroless Plating Scheme to Hermetically Seal Copper Features." *IBM Technical Disclosure Bulletin*, pp. 405-406.

Scarr, J.M. and J. K. Zelisse. Apr. 1993. "New Topology for Thickness Monitoring Eddy Current Sensors (Abstract)." *Proceedings of the 36th Annual Technical Conference*, Dallas, texas.

Matsuyama, Akira and Jessi Niou. 1993. "A State-of-the-Art Automation System of an ASIC Wafer Fab in Japan." *IEEE/SEMI International Semiconductor Manufacturing Science Syposium*, pp. 42-47.

Yeh, C. Eugene, John C. Cheng, and Kwan Wong. 1993. "Implementation Challenges of a Feedback Control System for Wafer Fabrication." *IEEE/CHMT International Electronics Manufacturing Technology Symposium* pp. 438-442.

Kurtzberg, Jerome M. and Menachem Levanoni. Jan. 1994. "ABC: A Better Control for Manufacturing." *IBM Journal of Research and Development*, v. 38, n. 1, pp. 11-30.

Mozumder, Purnendu K. and Gabriel G. Barna. Feb. 1994. "Statistical Feedback Control of a Plasma Etch Process." *IEEE Transactions on Semiconductor Manufacturing*, v. 7, n. 1, pp. 1-11.

Muller-Heinzerling, Thomas, Ulrich Neu, Hans Georg Nurnberg, and Wolfgang May. Mar. 1994. "Recipe-Contolled Operation of Batch Processes with Batch X." *ATP Automatisierungstechnische Praxis*, vol. 36, No. 3, pp. 43-51.

Stoddard, K., P. Crouch, M. Kozicki, and K. Tsakalis. Jun.-Jul. 1994. "Application of Feedforward and Adaptive Feedback Control to Semiconductor Device Manufacturing (Abstract)." *Proceedings of 1994 American Control Conference—ACC '94*, vol. 1, pp. 892-896. Baltimore, Maryland.

Schaper, C.D., M.M. Moslehi, K. C. Saraswat, and T. Kailath. Nov. 1994. "Modeling, Identification, and Control of Rapid Thermal Processing Systems (Abstract)." *Journal of the Electrochemical Society*, vol. 141, No. 11, pp. 3200-3209.

Tao, K. M., R. L. Kosut, M. Ekblad, and G. Aral. Dec. 1994. "Feedforward Learning Applied to RTP of Semiconductor Wafers (Abstract)." *Proceedings of the 33rd IEEE Conference on Decision and Control*, vol. 1, pp. 67-72. Lake Buena Vista, Florida.

Hu, Albert, He Du, Steve Wong, Peter Renteln, and Emmanuel Sachs. 1994. "Application of Run by Run Controller to the Chemical-Mechanical Planarization Process." *IEEE/CPMT International Electronics Manufacturing Technology Symposium*, pp. 371-378.

Spanos, C.J., S. Leang, S.-Y. Ma, J. Thomson, B. Bombay, and X. Niu. May 1995. "A Multistep Supervisory Controller for Photolithographic Operations (Abstract)." *Proceedings of the Symposium on Process Control, Diagnostics, and Modeling in Semiconductor Manufacturing*, pp. 3-17.

Leang, Sovarong, Shang-Yi Ma, John Thomson, Bart John Bombay, and Costas J. Spanos. May 1996. "A Control System for Photolithographic Sequences." *IEEE Tranactions on Semiconductor Manufacturing*, vol. 9, No. 2.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical-Mechanical Polishing." *IEEE Transactions on components, Packaging, and Manufacturing Technology—Part C*, vol. 19, No. 4, pp. 307-314.

Zhe, Ning, J. R. Moyne, T. Smith, D. Boning, E. Del Castillo, Yeh Jinn-Yi, and Hurwitz. Nov. 1996. "A Comparative Analysis of Run-to-Run Control Algorithms in Semiconductor Manufacturing Industry (Abstract)." *IEEE/SEMI 1996 Advanced Semiconductor Manufacturing Conference Workshop*, pp. 375-381.

Yasuda, M., T. Osaka, and M. Ikeda. Dec. 1996. "Feedforward Control of a Vibration Isolation System for Disturbance Suppression (Abstract)." *Proceedings of the 35th IEEE Conference on Decision and Control*, vol. 2, pp. 1229-1233. Kobe, Japan.

Fan, Jr-Min, Ruey-Shan Guo, Shi-Chung Chang, and Kian-Huei Lee. 1996. "Abnormal Tred Detection of Sequence-Disordered Data Using EWMA Method." *IEEE/SEMI Advanced Semiconductor Manufacturing Conference*, pp. 169-174.

Smith, Taber and Duane Boning. 1996. "A Self-Tuning EWMA Controller Utilizing Artificial Neural Network Function Approximation Techniques." *IEEE/CPMT International Electronics Manufacturing Technology Symposium*, pp. 355-363.

Guo, Ruey-Shan, Li-Shia Huang, Argon Chen, and Jin-Jung Chen. Oct. 1997. "A Cost-Effective Methodology for a Run-by-Run EWMA Controller." *6th International Symposium on Semiconductor Manufacturing*, pp. 61-64.

Mullins, J. A., W. J. Campbell, and A. D. Stock. Oct. 1997. "An Evaluation of Model Predictive Control in Run-to-Run Processing in Semiconductor Manufacturing (Abstract)." *Proceedings of the SPIE—The International Society for Optical Engineering Conference*, vol. 3213, pp. 182-189.

Reitman, E. A., D. J. Friedman, and E. R. Lory. Nov. 1997. "Pre-Production Results Demonstrating Multiple-System Models for Yield Analysis (Abstract)." *IEEE Transactions on Semiconductor Manufacturing*, vol. 10, No. 4, pp. 469-481.

Durham, Jim and Myriam Roussel. 1997. "A Statistical Method for Correlating In-Line Defectivity to Probe Yield." *IEEE/SEMI Advanced Semiconductor Manufacturing Conference*, pp. 76-77.

Shindo, Wataru, Eric H. Wang, Ram Akella, and Andrzej J. Strojwas. 1997. "Excursion Detection and Source Isolation in Defect Inspection and Classification." *2nd International Workshop on Statistical Metrology*, pp. 90-93.

Jul. 1998. "Active Controller: Utilizing Active Databases for Implementing Multistep Control of Semiconductor Manufacturing (Abstract)," *IEEE Transactions on Components, Packaging and Manufacturing Technology—Part c*, vol. 21, No. 3, pp. 217-224.

Fang, S. J., A. Barda, T. Janecko, W. Little, D. Outley, G. Hempel, S. Joshi, B. Morrison, G. B. Shinn, and M. Birang. 1998. "Control of Dielectric Chemical Mechanical Polishing (CMP) Using and Interferometry Based Endpoint Sensor." *International Proceedings of the IEEE Interconnect Technology Conference*, pp. 76-78.

Ouma, Dennis, Duane Boning, James Chung, Greg Shinn, Leif Olsen, and John Clark. 1998. "An Integrated Characterization and Modeling Methodology for CMP Dielectric Planarization." *Proceedings of the IEEE 1998 International Interconnect Technology Conference*, pp. 67-69.

Boning, Duane S., Jerry Stefani, and Stephanie W. Butler. Feb. 1999. "Statistical Methods for Semiconductor Manufacturing." *Encyclopedia of Electrical Engineering, J. G. Webster, Ed.*

McIntosh, John. Mar. 1999. "Using CD-SEM Metrology in the Manufacture of Semiconductors (Abstract)." *JOM*, vol. 51, No. 3, pp. 38-39.

Pan, J. Tony, Ping Li, Kapila Wijekoon, Stan Tsai, and Fritz Redeker. May 1999. "Copper CMP Integration and Time Dependent Pattern Effect." *IEEE 1999 International Interconnect Technology Conference*, pp. 164-166.

Meckl, P. H. and K. Umemoto. Aug. 1999. "Achieving Fast Motions in Semiconductor Manufacturing Machinery (Abstract)," *Proceedings of the 1999 IEEE International Conference on Control Applications*, vol. 1, pp. 725-729. Kohala Coast, HI.

Khan, K., El Chemali, J. Moyne, J. Chapple-Sokol, R. Nadeau, P. Smith, C., T. Parikh. Oct. 1999. "Yield Improvement at the Contact Process Through Run-to-Run Control (Abstract)." *24th IEEE/CPMT Electronics Manufacturing Technology Symposium*, pp. 258-263.

Ruegsegger, Steven, Aaron Wagner, James S. Freudenberg, and Dennis S. Grimard. Nov. 1999. "Feedforward Control for Reduced Run-to-Run Variation in Microelectronics Manufacturing." *IEEE Transactions on Semiconductor Manufacturing*, vol. 12, No. 4.

Nov. 1999. "How to Use EWMA to Achieve SPC and EPC Control." *International Symposium on NDT Contribution to the Infrastructure Safety Systems*, Tores, Brazil. <http://www.ndt.net/abstract/ndtiss99/data/35.htm>.

Edgar, T. F., W. J. Campbell, and C. Bode. Dec. 1999. "Model-Based Control in Microelectronics Manufacturing." *Proceedings of the 38th IEEE Conference on Decision and Control*, Phoenix, Arizona, vol. 4, pp. 4185-4191.

Meckl, P. H. and K. Umemoto. Apr. 2000. "Achieving Fast Motions by Using Shaped Reference Inputs [Semiconductor Manufacturing Machine] (Abstract)." *NEC Research and Development*, vol. 41, No. 2, pp. 232-237.

Oechsner, R., T. Tschaftary, S. Sommer, L. Pfitzner, H. Ryssel, H. Gerath, C. Baier, and M. Hafner. Sep. 2000. "Feed-forward Control for a Lithography/Etch Sequence (Abstract)." *Proceedings of the SPIE—The International Society for Optical Engineering Conference*, vol. 4182, pp. 31-39.

Cheung, Robin. Oct. 18, 2000. "Copper Interconnect Technology." *AVS/CMP User Group Meeting*, Santa Clara, CA.

Edgar, Thomas F., Stephanie W. Butler, W. Jarrett Campbell, Carlos Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." *Automatica*, v. 36, n. 11.

Khan, S., M. Musavi, and H. Ressom. Nov. 2000. "Critical Dimension Control in Semiconductor Manufacturing (Abstract)." *ANNIE 2000. Smart Engineering Systems Design Conference*, pp. 995-1000. St. Louis, Missouri.

ACM Research Inc. 2000. "Advanced Copper Metallization for 0.13 to 0.05 µm & Beyond." <http://acmrc.com/press/ACM-ECP-brochure.pdf>.

Ravid, Avi, Avner Sharon, Amit Weingarten, Vladimir Machavariani, and David Scheiner. 2000. "Copper CMP Planarity Control Using ITM." *IEEE/SEMI Advanced Semiconductor Manufacturing Conference*, pp. 437-443.

Chen, Argon and Ruey-Shan Guo. Feb. 2001. "Age-Based Double EWMA Controller and Its Application to CMP Processes." *IEEE Transactions on Semiconductor Manufacturing*, vol. 14, No. 1, pp. 11-19.

Tobin, K. W., T. P. Karnowski, L. F. Arrowood, and F. Lakhani. Apr. 2001. "Field Test Results of an Automated Image Retrieval System (Abstract)." *Advanced Semiconductor Manufacturing Conference, 2001 IEEE/SEMI*, Munich, Germany.

Tan, K. K., H. F. Dou, and K. Z. Tang. May-Jun. 2001. "Precision Motion Control System for Ultra-Precision Semiconductor and Electronic Components Manufacturing (Abstract)." *51st Electronic Components and technology Conference 2001. Proceedings*, pp. 1372-1379, Orlando, Florida.

Heuberger, U. Sep. 2001. "Coating Thickness Measurement with Dual-Function Eddy-Current & Magnetic Inductance Instrument (Abstract)." *Galvanotechnik*, vol. 92, No. 9, pp. 2354-2366+IV.

Wang, LeRen and Hefin Rowlands. 2001. "A Novel NN-Fuzzy-SPC Feedback Control System." *8th IEEE International Conference on Emerging Technologies and Factory Automation*, pp. 417-423.

Moyne, J., V. Solakhian, A. Yershov, M. Anderson, and D. Mockler-Hebert. Apr.-May 2002. "Development and Deployment of a Multi-Component Advanced Process Control System for an Epitaxy Tool (Abstract)." *2002 IEEE*

*Advanced Semiconductor Manufacturing Conference and Workshop*, pp. 125-130.

Sarfaty, M., A. Shanmugasundram, A. Schwarm, J. Paik, Jimin Zhang, Rong Pan, M. J. Seamons, H. Li, R. Hung, and S. Parikh. Apr.-May 2002. "Advnace Process Control Solutions for Semiconductor Manufacturing (Abstract)." *13th Annual IEEE/SEMI Advanced Semiconductor Manufacturing Conference. Advancing the Science and Technology of Semiconductor Manufacturing. ASMC 2002*, pp. 101-106. Boston, MA.

Campbell, W. J., S. K. Firth, A. J. Toprac, and T. F. Edgar. May 2002. "A Comparison of Run-to-Run Control Algorithms (Abstract)." *Proceedings of 2002 American Control Conference*, vol. 3, pp. 2150-2155.

Good, Richard and S. Joe Qin. May 2002. "Stability Analysis of Double EWMA Run-to-Run Control with Metrology Delay." *IEEE/CPMT International Electronics Manufacturing Technology Symposium*, pp. 355-363.

Smith, Stewart , Anthony J. Walton, Alan W. S. Ross, Georg K. H. Bodammer, and J. T. M. Stevenson. May 2002. "Evaluation of Sheet Resistance and Electrical Linewidth Measurement Techniques for Copper Damascene Interconnect." *IEEE Transactions on Semiconductor Manufacturing*, vol. 15, No. 2, pp. 214-222.

Itabashi, Takeyuki, Hiroshi Nakano, and Haruo Akahoshi. Jun. 2002. "Electroless Deposited CoWB for Copper Diffusion Barrier Metal." *IEEE INternational Interconnect Technology Conference*, pp. 285-287.

ACM Research,Inc. 2002. "ACM Ultra ECP® System: Electro-Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper_electrochemical_plating.html.

KLA-Tencor Corporation. 2002. "KLA Tencor: Press Release: KLA-Tencor Introduces First Production-Worthy Copper CMP In-Situ Film Thickness and End-point Control System: Multi-Million Dollar Order Shipped to Major CMP Tool Manufacturer." www.kla-tencor.com/news_events/press_release/press_releases2001/984086002.html.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogami. 2002. "Fragile Porous Low-k/Copper Integration by Using Electro-Chemical Polishing." *2002 Symposium on VLSI Technology Digest of Technical Papers*, pp. 32-33.

Cunningham, James A. 2003. "Using Electrochemistry to Improve Copper Interconnects." <http://www.e-insite.net/semiconductor/index.asp?layout=article&articleid=CA47465>.

Mar. 25, 2003. International Search Report for PCT/US02/24859 prepared by the European Patent Office.

Adams, Bret W., Bogdan Swedek, Rajeev Bajaj, Fritz Redeker, Manush Birang, and Gregory Amico. "Full-Wafer Endpoint Detection Improves Process Control in Copper CMP." *Semiconductor Fabtech*—12th Edition. Applied Materials, Inc., Santa Clara, CA.

Berman, Mike. Thomas Bibby, and Alan Smith, "Review of In Situ & In-line Detection for CMP Applications." *Semiconductor Fabtech*, 8th Edition, pp. 267-274.

"Semiconductor Manufacturing: An Overview." <http://users.ece.gatech.edu/~gmay/overview.html>.

Levine, Martin D. 1985. *Vision in Man and Machine*, New York: McGraw-Hill, Inc. pp. ix-xii, 1-58.

Pilu, Maurizio. Sep. 2001. "Undoing Page Curl Distortion Using Applicable Surfaces." *IEEE International Conference on Image Processing*. Thessalonica, Greece.

May 23, 2003. Written Opinion for PCT/US01/24910.

Williams, Randy, Dadi Gudmundsson, Kevin Monahan, Raman Nurani, Meryl Stoller and J. George Shanthikumar. Oct 1999. "Optimized Sample Planning for Wafer Defect Inspection," *Semiconductor Manufacturing Conference Proceedings, 1999 IEEE International Symposium on Santa Clara, CA*. Piscataway, NJ. pp. 43-46.

Jul. 23, 2003. Invitation to Pay Additional Fees and Communication Relating to the Results of the Partial International Search for PCT/US02/19116.

Aug. 1, 2003. Written Opinion for PCT/US01/27406.

Aug. 20, 2003. Written Opinion for PCT/US01/22833.

Miller, G. L., D. A. H. Robinson, and J. D. Wiley. Jul. 1976. "Contactless measurement of semiconductor conductivity by radio frequency-free-carrier power absorption." *Rev. Sci. Instrum.*, vol. 47, No. 7, pp. 799-805.

1999. "Contactless Bulk Resistivity/Sheet Resistance Measurement and Mapping Systems." www.Lehighton.com/fabtech/index.html.

2000. "Microsense II Capacitance Gaging System." www.adetech.com. 2000.

El Chemali, Chadi et al. Jul./Aug. 2000. "Multizone uniformity control of a chemical mechanical polishing process utilizing a pre- and postmeasurement strategy." *J. Vac. Sci. Technol.* vol. 18, No. 4. pp. 1287-1296, Jul./Aug. 2000.

Mar. 5, 2001. "KLA-Tencor Introduces First Production-worthy Copper CMP In-situ Film Thickness and End-point Control System." http://www.kla-tencor.com/j/servlet/NewsItem?newsItemID=74.

2002. "Microsense II—5810: Non-Contact Capacitance Gaging Module." www.adetech.com.

Aug. 8, 2003. PCT International Search Report from PCT/US03/08513.

Oct. 14, 2003. PCT International Search Report from PCT/US02/21942.

Oct. 20, 2003. PCT International Search Report from PCT/US02/19116.

Oct. 23, 2003. PCT International Preliminary Examination Report from PCT/US01/24910.

"NanoMapper wafer nanotopography measurement by ADE Phase Shift." http://www.phase-shift.com/nanomap.shtml, Dec. 9, 2003.

"Wafer flatness measurement of advanced wafers." http://www.phase-shift.com/wafer-flatness.shtml, Dec. 9, 2003.

"ADE Technologies, Inc.—6360." http://www.adetech.com/6360.shtml, Dec. 9, 2003.

"3D optical profilometer MicroXAM by ADE Phase Shift." http://www.phase-shift.com/microxam.shtml, Dec. 9, 2003.

"NanoMapper FA factory automation wafer nanotopography-measurement." http://www.phase-shift.com/nanomapperfa.shtml, Dec. 9, 2003.

Rocha, Joao and Carlos Ramos. Sep. 12, 1994. "Task Planning for Flexible and Agile Manufacturing Systems." *Intelligent Robots and Systems '94. Advanced Robotic Systems and the Real World, IROS '94. Proceedings of the IEEE/RSJ/GI International Conference on Munich, Germany* Sep. 12-16, 1994. New York, New York: IEEE. pp. 105-112.

Sun, S.C. 1998, "CVD and PVD Transition Metal Nitrides as Diffusion Barriers for Cu Metallization." *IEEE*. pp. 243-246.

Tagami, M., A. Furuya, T. Onodera, and Y. Hayashi. 1999. "Layered Ta-nitrides (LTN) Barrier Film by Power Swing Sputtering (PSS) Technique for MOCVD-Cu Damascene Interconnects." *IEEE*. pp. 635-638.

Yamagishi, H., Z. Tokei, G.P. Beyer, R. Donaton, H. Bender, T. Nogami, and K. Maex. 2000. "TEM/SEM Investigation and Electrical Evaluation of a Bottomless I-PVD TA (N) Barrier in Dual Damascene" (Abstract). *Advanced Metallization Conference 2000*. San Diego, CA.

Eisenbraun, Eric, Oscar van der Straten, Yu Xhu, Katherine Dovidenko, and Alain Kaloyeros. 2001. "Atomic Layer Deposition (ALD) of Tantalum-Based Materials for Zero Thickness Copper Barrier Applications" (Abstract). *IEEE*. pp. 207-209.

Smith, S.R., K.E. Elers, T. Jacobs, V. Blaschke, and K. Pfeifer. 2001. "Physical and Electrical Characterization of ALD Tin Used as a Copper Diffusion Barrier in 0.25 mum, Dual Damascene Backend Structures" (Abstract). *Advanced Metallization Conference 2001*, Montreal, Quebec.

Mar. 15, 2002. Office Action for U.S. Appl. No. 09/469,227, filed Dec. 22, 1999.

Jun. 20, 2002. Office Action for U.S. Appl. No. 09/619,044, filed Jul. 19, 2000.

Sep. 26, 2002. Office Action for U.S. Appl. No. 09/637,620, filed Aug. 11, 2000.

Oct. 23, 2002. Office Action for U.S. Appl. No. 09/469,227, filed Dec. 22, 1999.

Kim, Y.T. and H. Sim. 2002. "Characteristics of Pulse Enhanced Atomic Layer Deposition of Tungsten Nitride Diffusion Barrier for Copper Interconnect" (Abstract). *IEIC Technical Report*. vol. 102, No. 178, pp. 115-118.

Elers, Kai-Erik, Ville Saanila, Pekka J. Soininen, Wei-Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). *Advanced Materials*. vol. 14, No. 13-14, pp. 149-153.

Peng, C.H. Hsieh, C.L. Huang, J.C. Lin, M.H. Tsai, M.W. Lin, C.L. Chang, Winston S. Shue, and M.S. Liang. 2002, "A 90nm Generation Copper Dual Damascene Technology with ALD TaN Barrier." *IEEE*. pp. 603-606.

Van der Straten, O., Y. Zhu, E. Eisenbraum, and A. Kaloyeros. 2002. "Thermal and Electrical Barrier Performance Testing of Ultrathin Atomic Layer Deposition Tantalum-Based Materials for Nanoscale Copper Metallization." *IEEE*, pp. 188-190.

Wu, Z.C., Y.C. Lu, C.C. Chiang, M.C. Chen. B.T. Chen, G.J. Wang, Y.T. Chen, J.L. Huang, S.M. Jang, and M.S. Liang. 2002. Advanced Metal Barrier Free Cu Damascene Interconnects with PECVD Silicon Carbide Barriers for 90/65-nm BEOL Technology, *IEEE*, pp. 595-598.

Jul. 25, 2003. International Search Report for PCT/US02/24858.

Aug. 8, 2003. International Search Report for PCT/US03/08513.

Dec. 16, 2003. International Search Report for PCT/US03/23964.

Jan. 23, 2004. International Search Report for PCT/US02/24860.

Mar. 30, 2004. Written Opinion for PCT/US02/19062.

Apr. 9, 2004. Written Opinion for PCT/US02/19116.

Apr. 28, 2004. Written Opinion for PCT/US02/19117.

Apr. 29, 2004. Written Opinion for PCT/US02/19061.

May 5, 2004. International Preliminary Examination Report for PCT/US01/27406.

IslamRaja, M. M., C. Chang, J. P. McVittie, M. A. Cappelli, and K. C. Saraswat. May/Jun. 1993. "Two Precursor Model for Low-Pressure Chemical Vapor Deposition of Silicon Dioxide from Tetraethylorthosilicate." *J. Vac. Sci. Technol. B*, vol. 11, No. 3, pp. 720-726.

Kim, Eui Jung and William N. Gill. Jul. 1994. "Analytical Model for Chemical Vapor Deposition of $SiO_2$ Films Using Tetraethoxysliane and Ozone" (Abstract). *Journal of Crystal Growth*, vol. 140, Issues 3-4, pp. 315-326.

Guo, R.S, A. Chen, C.L. Tseng, I.K. Fong, A. Yang, C.L. Lee, C.H. Wu, S. Lin, S.J. Huang, Y.C. Lee, S.G. Chang, and M.Y. Lee. Jun. 16-17, 1998. "A Real-Time Equipment Monitoring and Fault Detection System." *Semiconductor Manufacturing Technology Workshop*, pp. 111-121.

Lantz, Mikkel. 1999. "Equipment and APC Integration at AMD with Workstream." *IEEE*, pp. 325-327.

Jul. 15, 2004. Office Action for U.S. Appl. No. 10/172,977, filed Jun. 18, 2002.

Aug. 2, 2004. Office Action for U.S. Appl. No. 10/174,377, filed Jun. 18, 2002.

Aug. 9, 2004. Written Opinion for PCT Serial No. PCT/US02/19063.

Aug. 18, 2004. International Preliminary Examination Report for PCT Serial No. PCT/US02/19116.

Aug. 24, 2004. Office Action for U.S. Appl. No. 10/135,405, filed May 1, 2002.

Aug. 25, 2004. Office Action for U.S. Appl. No. 09/998,384, filed Nov. 30, 2001.

Sep. 9, 2004. Written Opinion for PCT Serial No. PCT/US02/21942.

Sep. 16, 2004. International Preliminary Examination Report for PCT Serial No. PCT/US02/24859.

Sep. 15, 2004. Office Action for U.S. Appl. No. 10/632,107, filed Aug. 1, 2003.

Oct. 1, 2004. International Preliminary Examination Report for PCT Serial No. PCT/US03/23964.

Oct. 6, 2004. Office Action for U.S. Appl. No. 10/759,108, filed Jan. 20, 2004.

Oct. 12, 2004. International Preliminary Examination Report for PCT Serial No. PCT/US02/19061.

Nov. 17, 2004. Written Opinion for PCT Serial No. PCT/US01/27407.

Hu, Albert, Kevin Nguyen, Steve Wong, Xiuhua Zhang, Emanuel Sachs, and Peter Renteln. 1993. "Concurrent Deployment of Run by Run Controller Using SCC Framework. " *IEEE/SEMI International Semiconductor Manufacturing Science Symposium*. pp. 126-132.

Hu, Albert, He Du, Steve Wong, Peter Renteln, and Emanuel Sachs. 1994. "Application of Run by Run Controller to the Chemical-Mechanical Planarization Process." *IEEE/CPMT International Electronics Manufacturing Technology Symposium*. pp. 371-378.

Smith, Taber, Duane Boning, James Moyne, Arnon Hurwitz, and John Curry. Jun. 1996: "Compensating for CMP Pad Wear Using Run by Run Feedback Control." *Proceedings of the Thirteenth International VSLM Multilevel Interconnection Conference*. pp. 437-439.

Suzuki, Junichi and Yoshikazu Yamamoto. 1998. "Toward the Interoperable Software Design Models: Quaret of UML, XML, DOM and COBRA." *Proceedings IEEE International Software Engineering Standards Symposium*. pp. 1-10.

Klein, Bruce. Jun. 1999. "Application Development: XML Makes Object Models More Useful." *Informationweek*. pp. 1A-6A.

Chemali, Chadi El, James Moyne, Kareemullah Khan, Rock Nadeau, Paul Smith, John Colt, Jonathan Chapple-Sokol, and Tarun Parikh. Jul./Aug. 2000. "Multizone Uniformity Control of a Chemical Mechanical Polishing Process Utilizing a Pre- and Postmeasurment Strategy." J.. Vac. Sci. Technol. A, vol. 18(4). pp. 1287-1296. American Vacuum Society.

Jensen, Alan, Peter Renteln, Stephen Jew, Chris Raeder, and Patrick Cheung. Jun. 2001. "Empirical-Based Modeling for Control of CMP Removal Uniformity." Solid State Technology, vol. 44, No. 6, pp. 101-102, 104, 106., Cowan Publ. Corp.: Washington, D.C.

Sarfaty, Moshe, Arulkumar ShanmugasundraM, Alexander Schwarm, Joseph Paik, Jimin Zhang, Rong Pan, Martin J. Seamons, Howard II, Raymond Hung, and Suketu Parikh. Apr./May 2002. "Advance Process Control Solutions for Semiconductor Manufacturing." IEEE/SEMI Advanced Semiconductor Manufacturing Conference. pp. 101-106.

Oct. 4, 2002. International Search Report from PCT/US01/22833.

Oct. 23, 2002. International Search Report from PCT/US01/27406.

Nov. 7, 2002. International Search Report from PCT/US02/19061.

Nov. 11, 2002. International Search Report from PCT/US02/19117.

Nov. 12, 2002. International Search Report from PCT/US02/19063.

US 6,150,664, 11/2000, Su (withdrawn)

* cited by examiner

COMPUTER INTEGRATED MANUFACTURING TECHNIQUES

This invention was made with United States Government support under Cooperative Agreement No. 70NANB7H3043 awarded by NIST. The United States Government has certain rights in the invention.

FIELD OF THE INVENTION

The present invention relates to techniques for computer integrated manufacturing.

BACKGROUND OF THE INVENTION

A semiconductor device such as an IC (integrated circuit) generally has electronic circuit elements such as transistors, diodes and resistors fabricated integrally on a single body of semiconductor material. The various circuit elements are connected through conductive connectors to form a complete circuit which can contain millions of individual circuit elements. Integrated circuits are typically fabricated from semiconductor wafers in a process consisting of a sequence of processing steps. This process, usually referred to as wafer fabrication or wafer fab, includes such operations as oxidation, etch mask preparation, etching, material deposition, planarization and cleaning.

A summary of an aluminum gate PMOS (p-channel metal oxide semiconductor transistor) wafer fab process 40 is schematically shown in FIG. 1, illustrating major processing steps 41 through 73, as described in W. R. Runyan et al., *Semiconductor Integrated Circuit Processing Technology*, Addison-Wesley Publ. Comp. Inc., p.48, 1994. Each of these major processing steps typically include several sub steps. For example, a major processing step such as metallization to provide an aluminum layer by means of sputter deposition in a wafer fab chamber is disclosed in U.S. Pat. No. 5,108,570 (R. C. Wang, 1992). This sputter deposition process is schematically shown in sub steps 81 through 97 of process 80, see FIG. 2.

FIGS. 1 and 2 show sequential wafer fab processes. It is also known to utilize wafer fab sub systems which provide parallel processing steps. Such sub systems typically include one or more cluster tools. A cluster tool as defined herein includes a system of chambers and wafer handling equipment wherein wafers are processed in the cluster tool chambers without leaving a controlled cluster tool environment such as vacuum. An example of a cluster tool is disclosed in U.S. Pat. No. 5,236,868 (J. Nulman, 1993) which employs a vacuum apparatus having a central chamber and four processing chambers. A wafer handling robot in the central chamber has access to the interior of each the processing chambers in order to transfer wafers from the central chamber into each of the chambers while keeping the wafers in a vacuum environment. In one example, wafers in the '868 cluster are first transferred for processing to a cleaning chamber, then to a PVD (physical vapor deposition) chamber, followed by transfer to an annealing chamber and subsequently to a degassing chamber, thus utilizing a sequential process. It is also known to use cluster tools such as those disclosed in the '868 patent to process wafers in chambers which are used in parallel. For example, if a slow processing step is followed by a fast processing step, three chambers can be used in parallel for the slow process while the fourth chamber is used for the fast process.

Effective wafer inventory management is necessary for maintaining inventories of unprocessed or partly processed wafers at a minimum and thereby minimizing the unit cost of the semiconductor devices which are produced in the wafer fab. Minimizing inventories of wafers in process also has a wafer yield benefit because it is well known that the longer wafers are in the process, the lower their yield. Wafer inventory management typically uses scheduling techniques to maximize equipment capabilities in view of the demand for processed wafers, for example by scheduling parallel and series processing steps to avoid processing bottlenecks. It is well known to those of ordinary skill in the art that in-process wafer inventory management is facilitated by in-process wafer tracking, such as tracking wafer lots and wafer cassettes throughout a wafer fab. Effective inventory management of a wafer fab also requires a low incidence of bottlenecks or interruptions due to unscheduled down times which can for example be caused by unscheduled maintenance, interruptions resulting from processing parameters which are outside their specified limits, unavailability of required materials such as a process gas, unavailability of necessary maintenance replacement parts or unavailability of a processing tool such as a chamber.

Many components or sub-systems of a wafer fab are automated in order to achieve a high degree of processing reliability and reproducibility and to maximize yields. Wafer fab tools such as chambers are typically controlled by a computer using a set of instructions which are generally known as a recipe for operating the process which is executed by the tool. However, it is recognized that a high degree of automation wherein various processes and metrologies are integrated, is difficult to achieve due to the complexity and inter dependency of many of the wafer fab processes, see for example Peter van Zandt, *Microchip Fabrication*, $3^{rd}$ ed., McGraw-Hill, pp. 472–478, 1997. Manufacturing systems such as a wafer fab are known to utilize software which provides an MES (manufacturing executions systems) function. Desirably, a wafer fab MES should be integrated for an entire wafer fab in order to achieve centralized wafer fab management and control. However, it is well known to those of ordinary skill in the art that a commercial wafer fab typically includes semiconductor processing tools from different equipment manufacturers, resulting in tool compatibility difficulties when attempts are made to develop an integrated MES. Another shortcoming of currently available wafer fab MES is the need for extensive software programming for each process change in the wafer fab, such as is necessary for changing a recipe, adding or replacing a tool, or changing the wafer fab to make a different wafer product.

It is well known to those of ordinary skill in the art that the functions of semiconductor manufacturing equipment, including for example a wafer fab, can be defined in basic equipment states such as the six states schematically illustrated in FIG. 3, see *SEMI E*10-96, *Standard For Definition And Measurement Of Equipment Reliability, Availability, And Maintainability (RAM)*, published by Semiconductor Equipment and Materials International (SEMI), pp. 1–23, 1996. The semiconductor industry typically uses these six equipment states to measure and express equipment RAM (reliability availability and maintainability), based on functional equipment issues which are independent of who performs the function. These six basic equipment states include non-scheduled time 102 (FIG. 3), unscheduled downtime 104, scheduled downtime 106, engineering time 108, standby time 110 and productive time 112. Non-scheduled time 102 represents the time period wherein the equipment is not scheduled to be used, for example unworked shift. Unscheduled downtime 104 concerns time periods wherein the equipment is not in a condition to perform its intended function, e.g. during equipment repair. Scheduled downtime 106 occurs when the equipment is capable of performing its function but is not available to do this, such as process setup or preventive maintenance. Engineering time 108 concerns the time period wherein the equipment is operated to conduct engineering tests, for example equipment evaluation. Standby time 110 is a time period wherein the equipment is not operated even though it is in a condition to perform its intended function and is capable of performing its function, for example no operator is available or there is no input from the relevant information systems. Productive state 112 represents the time period wherein the equipment is performing its intended function, such as regular production and rework.

Total time period 114, see FIG. 3, is the total time during the period being measured; this includes the six equipment states 102, 104, 106, 108, 110 and 112. Operations time 116 concerns the total time period of states 104, 106, 108, 110 and 112. Operations time 116 includes equipment downtime 118 consisting of states 104 and 106, and equipment uptime 120. Equipment uptime 120 includes engineering time 108 and manufacturing time 122 which consists of standby time 110 and productive time 112.

FIGS. 4 and 5 provide more detailed schematic illustrations of the six equipment states shown in FIG. 3, see SEMI E10-96, at pp. 1–6. As depicted in FIG. 4, total time 114 consists of non-scheduled time 102 and operations time 116. Non-scheduled time 102 includes unworked shifts 130, equipment installation, modification, rebuilding or upgrading 132, off-line training 134 and shutdown or start-up time period 136. Operations time 116, as schematically illustrated in FIG. 5, consists of equipment downtime 118 and equipment uptime 120. Equipment downtime 118 consists of unscheduled downtime 104 and scheduled downtime 106. Unscheduled downtime 104 includes downtime for maintenance delay 140, repair time 142, changing consumables/chemicals 144, out of specification input 146 or facilities related downtime 148. Scheduled downtime 106 concerns downtime for maintenance delay 150, production test 152, preventive maintenance 154, changing consumables/chemicals 156, setup 158 or facilities related 159.

Equipment uptime 120, depicted in FIG. 5, consists of engineering time 108 and manufacturing time 122. Engineering time 108 includes process experiments 160 and equipment experiments 162. Manufacturing time 110 consists of standby time 110 and productive time 112. Standby time 110 includes time during which there is no operator 180, no product 182, no support tool 184 or when an associated cluster module is down 186. Productive time 112 concerns a time period during which there is regular production 190, work for a third party 192, rework 194 or an engineering run 196. The various equipment states as described in connection with FIGS. 3–5 provide a basis for communicating and evaluating RAM related equipment information in the semiconductor industry. RAM related equipment information includes topics which are well known to those of ordinary skill in the art such as: equipment reliability, equipment availability, equipment maintainability and equipment utilization, see for example SEMI E10-96 at pp. 6–11. Generally, MES functions can be employed to keep track of information regarding equipment states in manufacturing systems such as a wafer fab.

Advances in semiconductor materials, processing and test techniques have resulted in reducing the overall size of the IC circuit elements, while increasing their number on a single body. This requires a high degree of product and process control for each processing step and for combinations or sequences of processing steps. It is thus necessary to control impurities and particulate contamination in the processing materials such as process gases. Also, it is necessary to control processing parameters such as temperature, pressure, gas flow rates, processing time intervals and input sputter power. As illustrated in FIGS. 1 and 2, a wafer fab includes a complex sequence of processing steps wherein the result of any particular processing step typically is highly dependent on one or more preceding processing steps. For example, if there is an error in the overlay or alignment of etch masks for interconnects in adjacent IC layers, the resulting interconnects are not in their proper design location. This can result in interconnects which are packed too closely, forming electrical short defects between these interconnects. It is also well known that two different processing problems can have a cumulative effect. For example, a misalignment of interconnect etch masks which is not extensive enough to result in an electrical short, can still contribute to causing an electrical short if the process is slightly out of specification for allowing (or not detecting) particulate contamination having a particle size which would not have caused an electrical short if the interconnect masks had been in good alignment.

Processing and/or materials defects such as described above generally cause a reduced wafer fab yield, wherein the yield is defined as the percentage of acceptable wafers that are produced in a particular fab. In-process tests and monitoring of processing parameters are utilized to determine whether a given in-process product or process problem or defect indicates that intervention in the process run is necessary, such as making a processing adjustment or aborting the run. Consequently, product and process control techniques are used extensively throughout a wafer fab. When possible, yield problems are traced back to specific product or processing problems or defects to ultimately improve the yield of the wafer fab. High yields are desirable for minimizing manufacturing costs for each processed wafer and to maximize the utilization of resources such as electrical power, chemicals and water, while minimizing scrap re-work or disposal.

It is known to use SPC (statistical process control) and SQC (statistical quality control) methods to determine suitable wafer fab control limits and to maintain the process within these limits, see for example R. Zorich, *Handbook Of Quality Integrated Circuit Manufacturing*, Academic Press Inc., pp. 464–498, 1991. SPC and SQC methodologies suitable for a wafer fab include the use of control charts, see for example R. Zorich at pp. 475–498. As is well known to those of ordinary skill in the art, a control chart is a graphical display of one or more selected process or product variables, such as chamber pressure, which are sampled over time. The target value of a particular variable and its upper and lower control limits are designated on the chart, using well known statistical sampling and computation methods. The process is deemed out of control when the observed value of the variable, or a statistically derived value such as the average of several observed values, is outside the previously determined control limits. Control limits are typically set at a multiple of the standard deviation of the mean of the target value, such as for example $2\sigma$ or $3\sigma$. The target value is derived from a test run or a production run which meets such wafer fab design criteria as yield, process control and product quality. SPC and SQC are considered synonymous when used in the above context, see R. Zorich at p. 464.

Accordingly, a need exists for methods and techniques which provide improved computer implemented integration of semiconductor manufacturing techniques in order to optimize process control, quality, yield and cost reduction. Also, there is a need for centralized wafer fab management and control through a computer integrated manufacturing system which facilitates processing or equipment changes without extensive software programming.

SUMMARY OF THE INVENTION

The present invention provides novel techniques for computer integrated manufacturing, particularly for manufacturing integrated circuit structures such as semiconductor wafers. These novel techniques provide the needed improvements in computer integration.

In one embodiment of the present invention a novel factory automation lifecycle is provided which includes SW for lifecycle activities for developing and integrating, installing and administrating, factory modeling, manufacturing planning, manufacturing controlling, monitoring and tracking, and lifecycle activities for analyzing manufacturing results. Output from an analyzing manufacturing results lifecycle activity can provide an input to other lifecycle activities, such as the factory modeling lifecycle activity. Framework components are associated with various lifecycle activities.

In another embodiment of the present invention a novel method for managing a processing system is provided which includes utilizing framework software components, application software components and software building blocks. The application components provide instructions for managing the system while the framework components are employed to manage the application components. The building blocks are adapted for forming or modifying framework and application components. A factory automation lifecycle includes the framework components. A novel tool integration component is employed by the novel method to communicate instructions to processing tools of the system. The tool integration component comprises a tool interface program and a tool integration component adapter. Instructions for managing the system can be modified by inputting data.

In still another embodiment of the present invention a novel method for processing a product includes determining the specifications for processing the product and then managing the process by means of a novel distributed factory system framework which includes framework components, application components and SW building blocks. The novel distributed factory system can be modified, if necessary, by inputting data. Computer implemented instructions for managing are formed by application components. These instructions are communicated to the process for manufacturing a product, for example by utilizing a tool integration component. The instructions are then implemented in the process, for example for fabricating integrated circuit structures.

In yet another embodiment of the present invention a novel method for starting a wafer fab run includes determining the sequence of processing steps and subsequently forming a workflow defining this sequence in a visual workflow component. The visual workflow component is included in a novel distributed factory system framework comprising framework components and application components. A request is then made to the visual workflow component to start the run by means of a work in progress management component or a GUI.

In another embodiment of the present invention an apparatus is provided including product processing equipment, a central processing unit, a link for operably linking the processing equipment to the central processing unit, a memory for storing digitally coded data structures, and data structures comprising a novel factory automation lifecycle. The present embodiment also provides for data structures including application components and building block components.

In still another embodiment of the present invention a distributed factory system framework is provided for managing a processing system, including a digitally coded first data structure comprising framework components, a second data structure including application components and a link for communicating digitally coded instructions to the processing system.

In yet another embodiment of the present invention a novel apparatus is provided comprising processing equipment and a novel distributed factory system framework for managing a processing system.

In additional embodiments of the present invention, novel data storage devices are provided comprising data structures such as novel factory automation lifecycle activity data structures, framework component data structures, application component data structures and building block data structures.

DETAILED DESCRIPTION OF THE INVENTION

While describing the invention and its embodiments, certain terminology will be utilized for the sake of clarity. It is intended that such terminology includes the recited embodiments as well as all equivalents.

In one embodiment of the invention a DFS/F (distributed factory system framework) SW (software) environment is provided to automate, integrate and coordinate factory MES (manufacturing execution system(s)) comprising equipment steps, decision steps and data steps which can be present in a processing, manufacturing or fabricating system or facility such as a wafer fab for processing or fabricating semiconductor structures, such as IC (integrated circuit) structures. The expression "FW" (framework) as defined herein, includes a collection of linked SW structures, components or classes that provide a functionality or a set of services. The expression "MES" as defined herein, includes a collection of SW data structures for starting processing related tasks, managing and/or controlling work in progress and facilitating the use of resources, such as materials, equipment, information and historical data for the execution of processing/ manufacturing/fabrication tasks, optionally including testing and data gathering tasks. The expression "IC structures" as defined herein, includes completely formed ICs and partially formed ICs.

Figure 1:
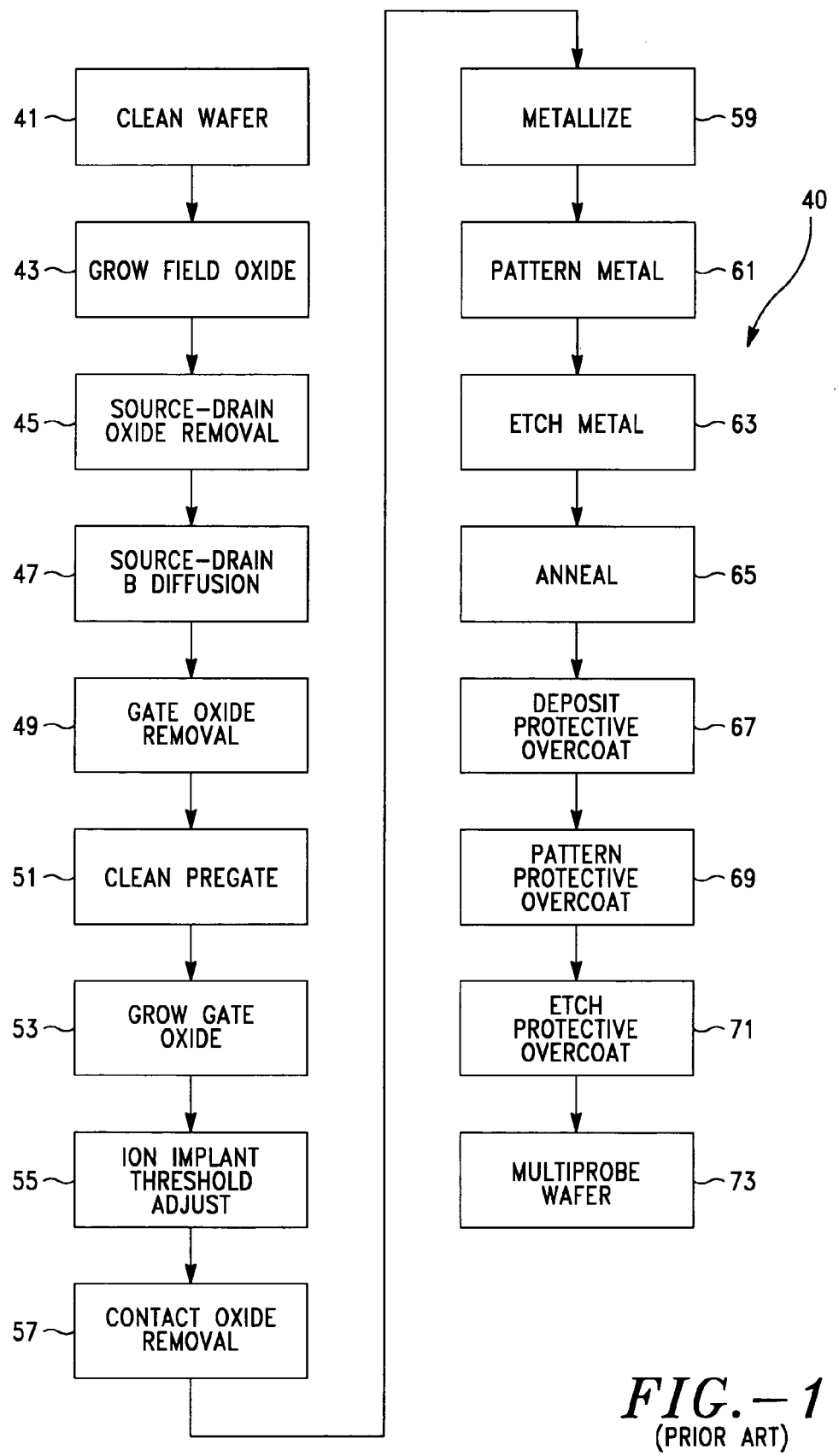
FIG. 1 is a flowchart schematically illustrating a prior art wafer fab process.
Figure 2:
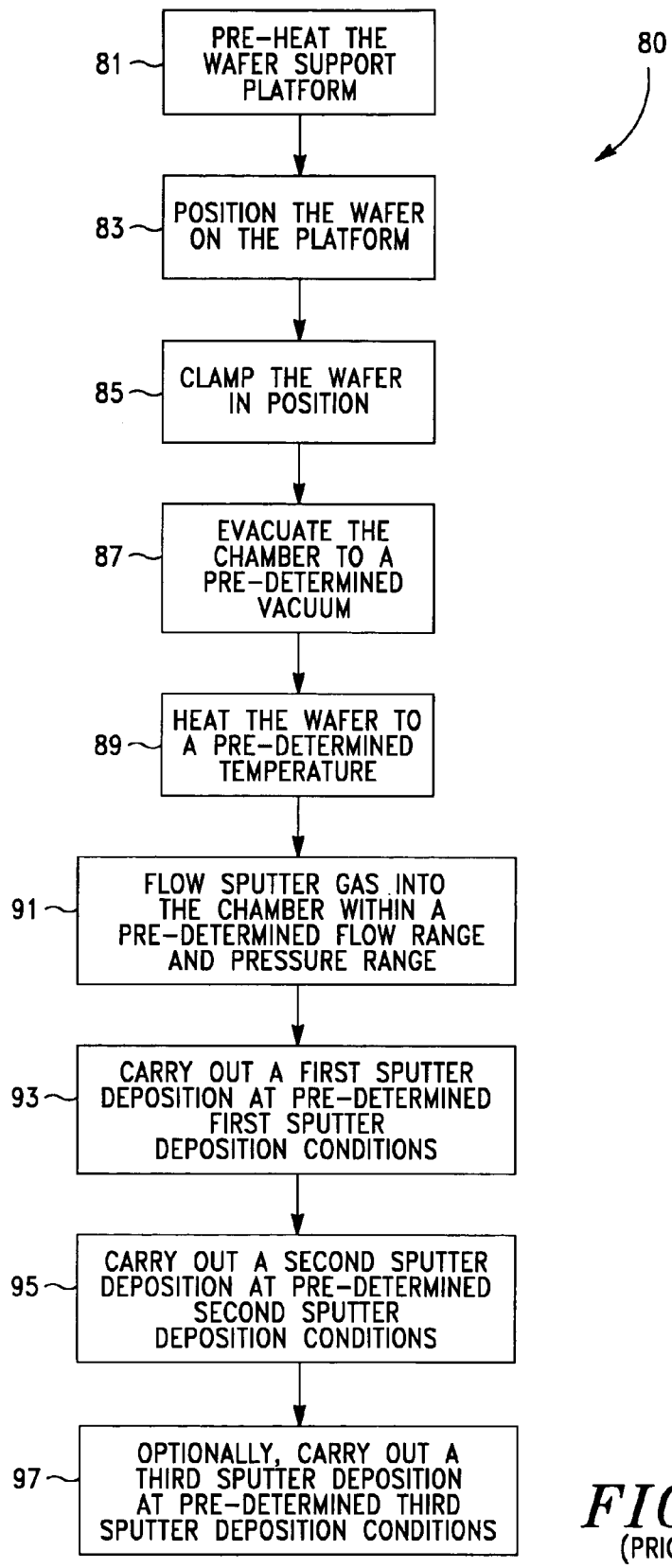
FIG. 2 is a flowchart schematically illustrating a prior art wafer fab sputter metallization process.
Figure 3:
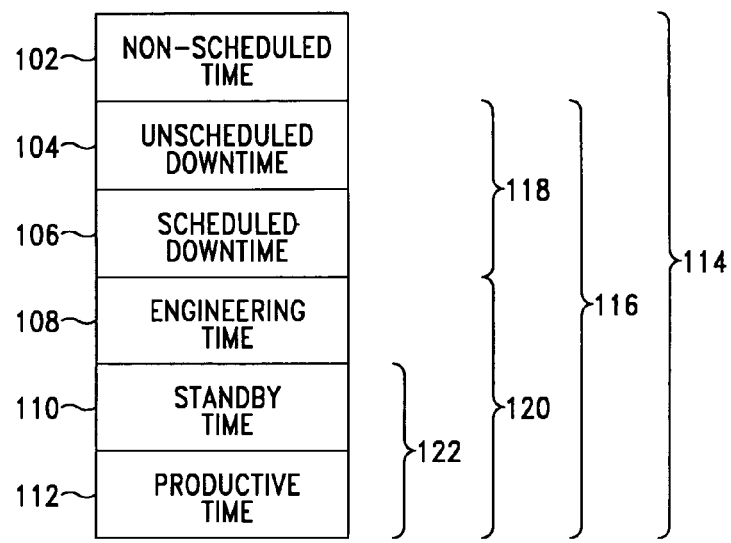
FIG. 3 is a stack chart schematically illustrating prior art equipment time states.
Figure 4:
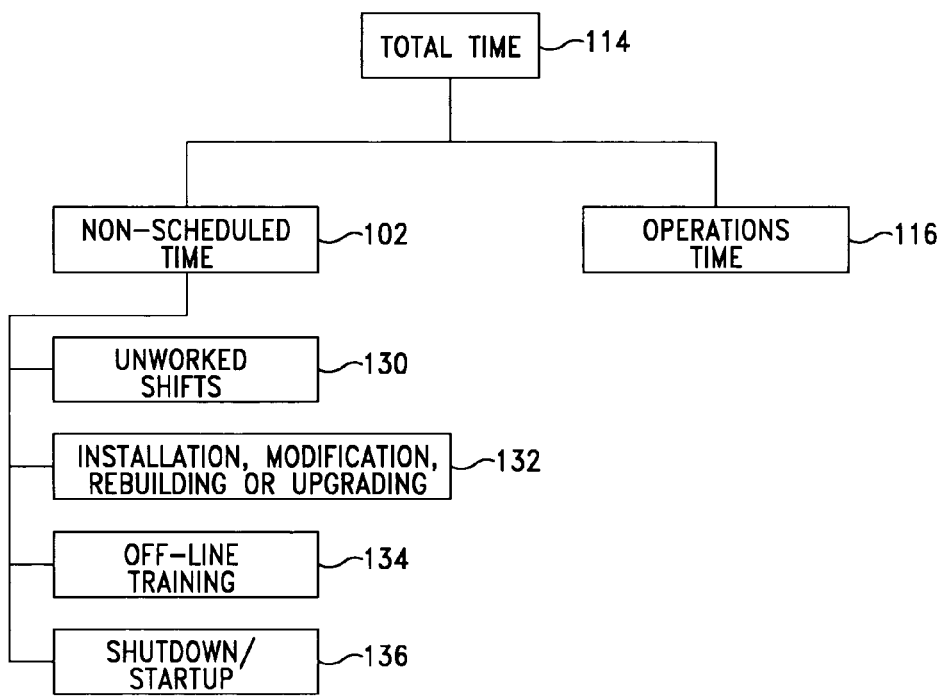
FIG. 4 is a block diagram schematically showing prior art equipment time states of the stack chart illustrated in FIG. 3.
Figure 5:
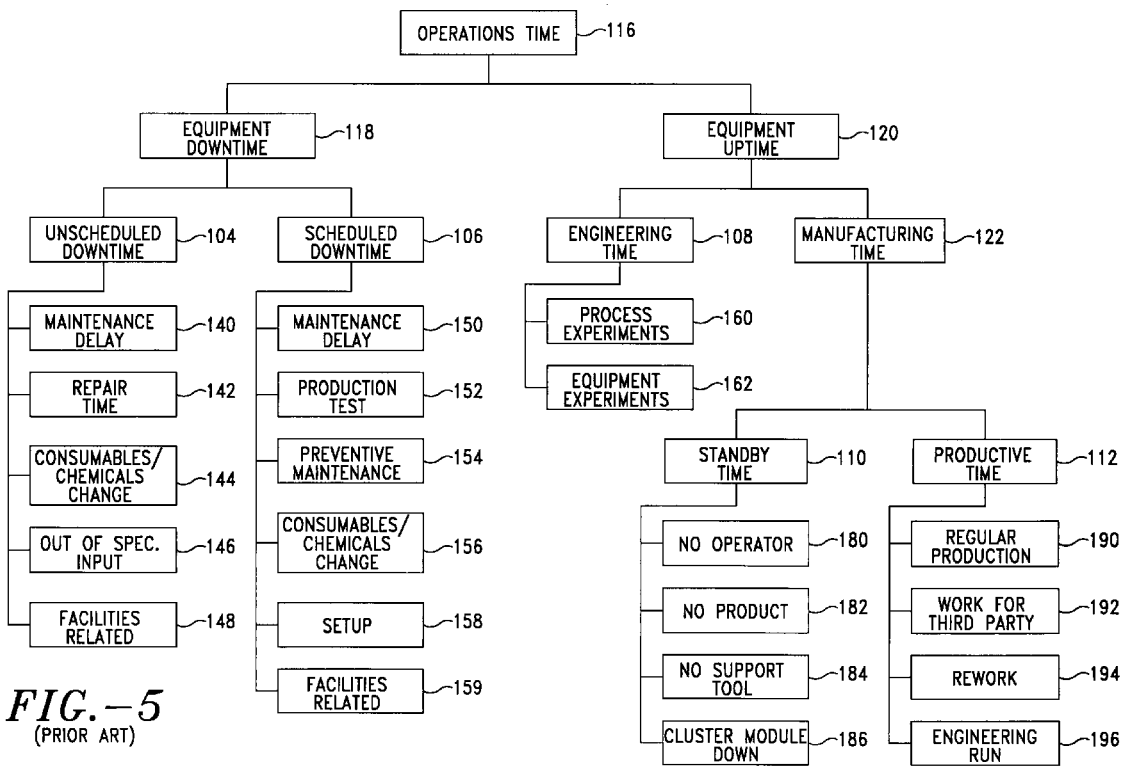
FIG. 5 is a block diagram schematically showing prior art equipment time states of the stack chart illustrated in FIG. 3.
Figure 6:
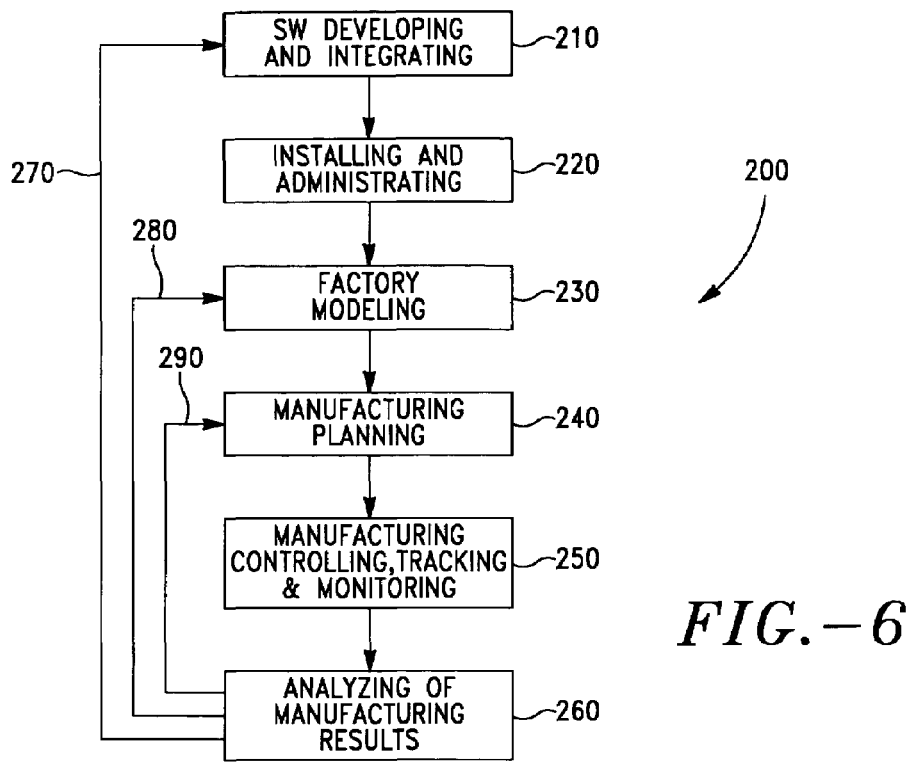
FIG. 6 is a block diagram schematically illustrating a factory automation lifecycle of the present invention.

DFS/F of the present invention includes a novel FALC (factory automation lifecycle) 200, shown in FIG. 6, to form an overall structure for integrated factory automation MES. FALC 200 is adapted for integrating, automating, managing or controlling various manufacturing related aspects of a processing, manufacturing or fabricating system or facility, thereby forming a factory model. These aspects can include wafer fab related equipment, such as wafer fab tools, methods such as wafer fab processing procedures, materials such as wafer fab process gases, inventory control, such as in-process wafer inventory control, work in process status determinations, evaluating in-process test data, monitoring equipment functions and quality management features, such as SPC (statistical process control). The novel lifecycle additionally facilitates the integration of tools, equipment or software from different tool, equipment or software suppliers to provide a coordinated manufacturing or fabricating facility wherein several tools are integrated.

Novel FALC 200, depicted in FIG. 6, includes an SW developing and integrating lifecycle activity 210, an installing and administrating lifecycle activity 220, a factory modeling lifecycle activity 230, a manufacturing planning lifecycle activity 240, a manufacturing controlling, monitoring and tracking lifecycle activity 250 and an analyzing of manufacturing results lifecycle activity 260. As schematically shown in FIG. 6, selected output from analyzing of manufacturing results lifecycle activity 260 can provide feedback to other lifecycle activities of the lifecycle, such as SW developing and integrating lifecycle activity 210, factory modeling lifecycle activity 230 and manufacturing planning lifecycle activity 240. The output and input interactions between these lifecycle activities will be described in more detail in connection with the description of lifecycle activity 260 for analyzing the manufacturing results.

The various lifecycle activities of FALC 200 of the present invention comprise SW. Hardware parts, equipment or assemblies are needed to support, operate or utilize the SW, which provides the functionality of the six lifecycle activities of FALC 200. The FALC 200 software includes FW SW components. The FW components define common system or factory operation rules and services and they are employed to provide services to application SW components which manage/control processing functions or systems, for example factories including fabricating facilities and various combinations of wafer fab tools, through interaction with the control system of processing equipment, such as on-board wafer fab tool controllers. Application components are adapted to meet the specific requirements of the process and the processing equipment, such as a wafer fab recipe. In other words, repeat processing runs of the same type of product in the same equipment using the same processing conditions does not require a modification in the application components. However, a change in materials, products, equipment or processing conditions typically requires modification of the data of one or more application components. For example, a change in a processing condition requires a corresponding change in one or more application components in order to provide the changed instructions to the equipment. FW components provide the services which enable a user to modify one or more application components to match novel DFS/F to a new processing condition or to a different material or tool. A novel FALC, such as FALC 200, can be adapted to new processing conditions, materials or equipment through data input, provided the adaptation does not require a change to a processing system which is substantially different. For example, the SW code of several application components of a wafer fab FALC is different from the SW code of the corresponding components of a FALC for a batch manufacturing process of a pharmaceutical product. Application components of the novel DFS/F communicate with equipment such as individual wafer fab tools through protocols and interfaces as will be described more fully in connection with TIC (tool integration component).

FW and application SW elements are referred to as components because they are separate SW entities, each with its own database, server, and standard GUI. The components inter-operate through a public set of communication standards such as DCOM (MICROSOFT®—Microsoft is a registered trademark of Microsoft Corporation, Redmond, Wash.13 distribute common object model) APIs (application programming interface) or CORBA (common object request broker architecture). SW common building blocks are provided in DFS/F to facilitate the creation of new FW and application components and to modify existing FW and application components. These building blocks typically include GUI (graphical user interface), server and DB (database) elements. Typically, DFS/F and FALC 200 components and SW building blocks are processed by one or more central processing units for data processing or one or more computers. Central processing units and computers which are suitable for the embodiments of the present invention are well known to those of ordinary skill in the art.

The six lifecycle activities of FALC 200, see FIG. 6, include the following functions. SW developing and integrating lifecycle activity 210 is adapted for defining a common structure for factory objects and servers. This common structure simplifies the formation of DFS/F compliant applications. Installing and administrating lifecycle activity 220 installs MES applications. It is necessary to register the capabilities of the MES applications with the DFS/F to make it possible to integrate the MES applications jointly with the capabilities of other applications. Lifecycle activity 220 also monitors and controls the software comprising the factory's MES. Additionally, it regulates access to MES capabilities, providing a common security service. Factory modeling lifecycle activity 230 is adapted for coordinating the formation of a consistent factory model in multiple manufacturing related applications. For example, the introduction of a new product typically requires changes in multiple applications, such as adding the product in both a WIP (work in progress) application and in a planning application. Lifecycle activity 230 is also adapted for defining the manner in which multiple applications will work together, for example defining how a WIP application and an equipment application can operate together to ensure that the correct equipment is used to manufacture a given product. SW of factory modeling lifecycle activity 230 is adapted for planning, controlling and tracking the manufacturing once a model of the factory's MES functions has been built by using factory modeling related SW.

Manufacturing planning lifecycle activity 240, depicted in FIG. 6, gathers status information from multiple applications in order to provide a planning application component. Additionally, lifecycle activity 240 develops and distributes manufacturing plans/schedules to the application components which manage the factory resources. Manufacturing controlling, monitoring and tracking lifecycle activity 250 is provided to coordinate the functioning of manufacturing application components in the execution of the manufacturing plan/schedule, to produce products according to the steps which are defined in the factory model. Analyzing manufacturing results lifecycle activity 260 is adapted for combining information from application components for analysis. It correlates data in different application components for data analysis and defines, detects and responds to specific factory events. This lifecycle activity is adapted for comparing actual production with planned production and indicating when an updated plan is needed through inputs to SW developing and integrating lifecycle activity 210, factory modeling lifecycle activity 230, and/or manufacturing planning lifecycle activity 240. As illustrated in FIG. 6, feedback loops from lifecycle activity 260 to these lifecycle activities form FALC 200 feedback cycles as follows. Feedback from lifecycle activity 260 to lifecycle activity 210 forms a SW developing cycle 270 while feedback from lifecycle activity 260 to lifecycle activity 280 provides a modeling cycle 280. An executing cycle 290 is formed in the feedback loop from lifecycle activity 260 to lifecycle activity 240. While the six lifecycle activities of novel FALC 200 have been depicted and described in a sequential manner, it will be understood that the SW associated with each of these lifecycle activities typically proceeds concurrently with one or more of the other lifecycle activities.

FALC 200 of the present invention described above is one facet of novel DFS/F. Two other facets of DFS/F are defined as: system layers and N tiers. The system layers aspect of novel DFS/F is described in Table I.

TABLE I

DFS/F System Layers

1. Base technology:
This includes the basic technology building blocks for DFS/F such as messaging, graphical user interface (GUI) construction, use of for example MTS (Microsoft transaction manager) for server construction, and mapping objects to a relational database for persistence.
2. Common building blocks:
This includes common items such as user-defined attributes, versioning, history and classification schemes. Typical common building blocks are listed and described in Table II.
3. Framework components:
FW components manage the overall operation of the factory system through the process of building a factory model, manufacturing products according to the model, and then assessing the outcome to determine the need for improvements. FALC 200 includes these components. Typical FW components are listed and described in Table III.
4. Application components:
These components comprise factory resource management functionality, such as material management, equipment management and tool integration such as VFEI (virtual factory equipment interface) level communications with tools. Typical application components are listed and described in Table IV.

The common building blocks of the novel DFS/F are typically utilized to form or modify FW and application components. Representative building blocks are shown in Table II.

TABLE II

Common Building Blocks

1. Server construction building block which includes interfacing between server API (application programming interface) and factory object instantiation (construction of an object instance).
2. Persistence building block for generating object to SQL/ODBC (structure query language/open DB connection) mapping.

TABLE II-continued

Common Building Blocks

3. DFS/F common GUI controls building block to provide the common controls for the construction of the GUIs.
4. Publish and subscribe messaging building block for publish subscribe messaging, which differs from synchronous DCOM messaging.
5. Dynamic API discovery building block used by FW components to discover services provided by DFS/F components.
6. Associations building block to connect objects across DFS/F components. Representative uses include linking modeling data to answer "where used" questions and linking MES execution information, such as quality data, to equipment history.
7. History building block to provide a common service to store and retrieve the history of factory events.
8. Generic service executor building block to execute the different types of DFS/F services including: (1) synchronous services, (2) long running services which are implemented through a completion callback protocol and (3) GUI based services that are implemented through a link between other services and a target computer desktop.
9. Classifications building block which provides a common service to classify factory objects for queries and analysis.
10. Customer defined attributes building block for extending the DFS/F component based object models. DFS/F typically provides user extensible attribute models which support expansion of the model based on the user's needs.
11. State models building block includes a service to define and then operate state models, such as tracking states for equipment, material and ECNs (engineering change notice). A state model building block can be defined such that it tracks unplanned downtime of the various chambers of a cluster tool.
12. Namespace building block defines management areas within DFS/F data models.
13. Schedule/datebook building block to support scheduling and add the capability for each factory object to have a datebook showing future events and history enhancements to indicate how a particular schedule was followed.
14. Templates building block provides services to define base definitions that can be shared among factory objects. For example, this building block can be used to define common characteristics for all memory products.
15. Versioned objects building block includes services to manage and track changes in factory model objects over time, e.g. for example managing and tracking changes in the definition of a particular product over time.
16. Navigation building block to view the relationship between factory objects such as a material lot history.

TABLE III

Framework Components

1. SC (security component) provides basic security having 3 security modes: (1) defining user roles, (2) assigning users to roles and (3) defining access to DFS/F objects and methods by role.
2. GCC (GUI console component) is a container supporting navigation and showing of data between DFS/F GUIs. Custom and/or third party applications can be added to the console toolbar. A custom environment can be created by adding GUIs and factory objects. The console can include a transaction view, i.e. full screen, cascade, tile and icons. A GUI console navigator allows browsing and selecting DFS/F factory objects and has search capability based on server-supplied search criteria. For example, it provides navigation and data sharing between ActiveX GUIs.
3. PLMC (performance & license management component) for tracking and regulating system usage of components.
4. SMC (saga management component) provides support for "long running" transactions that should be treated as a unit but take too long to rely on standard DB locking techniques.
5. CRC (context resolution component) aids in MES execution by linking context to results, insuring that the appropriate instructions are delivered to any resource by allowing users to flexibly model how resource selections are made.
6. CMC (configuration management component) provides the management of factory model changes across components.
7. CC (calendar component) provides calendar and shift definitions for scheduling and reporting.

TABLE III-continued

Framework Components

8. VWC (visual workflow component) defines and executes manufacturing processes and is capable of executing predetermined business processes. VWC defines business processes graphically as a sequence/network of service invocations from a palette of DFS/F services. Other DFS/F components utilize the VWC for process definitions. For example, the WIP management component uses VWC services to define how products are produced and uses it to execute the processing of material lots. VWC process definition capability includes the exchange of data between service invocations and control structures to determine/select the path(s) through predefined business processes. VWC is adapted for executing business processes autonomously, i.e. functioning independently of other SW components, and is capable of responding to automated inputs as well as to user inputs.
9. RCC (resource coordination component) is responsible for having active resources available at dispatch stations. Matches resources to common jobs/batches employing BRC. Together with BRC it coordinates rendezvous of active and passive resources.
10. EVMC (event monitor component) monitors/subscribes to events published by DFS/F services. A DFS/F service can be executed (including launching a VWC job) when a monitored event occurs. EVMC supports vigilant manufacturing through the creation of factory monitors.
11. BRC (bill of resources component) establishes the resources across multiple DFS/F components needed to launch a batch process, i.e. a batch process involving the coordinated action of multiple resources.
12. DMC (data manager component) consolidates data from FW components and application components for reporting and analysis. It is based on DW (data warehouse) technology and can provide sample DW star schema and reports. DMC can access DBs for unstructured data analysis.

TABLE IV

Application Components

1. QMC (quality management component) provides quality analysis and flexible data collection. It is able to determine corrective manufacturing tactics in order to ensure conformance to predetermined business rules.
2. TIC (tool integration component) providing two way communications between DFS/F and diverse equipment types. It is adapted for communicating through tool protocols such as SECS (SEMI - Semiconductor Equipment and Materials International - Equipment Communication Standard), GEM (generic equipment model) and VFEI (virtual factory equipment interface). SECS, GEM and VFEI are tool protocols which are well known to those of ordinary skill in the art.
3. EMC (equipment management component) resolves the different equipment states in SEMI E10 states, using a novel hierarchical model to track individual tools in chambers in cluster tools.
4. RMC (recipe management component) providing definition, selection and distribution of recipes to equipment such as fab tools.
5. DSC (dispatching and scheduling component) for scheduling and dispatching of factory tasks including processing and maintenance.
6. MHC (material handling component) for interfacing with materials handling equipment.
7. WMC (WIP -work in progress- management component) is provided to support tracking of wafers, lots, batches and carrier, supporting proactive business decisions for example: "if, then". WIP offers cluster tool visibility and control thereby providing MES to wafer lots inside the cluster tool.
8. Legacy system interface which is a component to access existing factory software.

A third facet of DFS/F of the present invention comprises the various tiers which can be present in the FW components, application components and common building blocks. For example, this can be a 3 tier facet as follows. A first tier includes clients using services from other SW programs or components, e.g. visual WF jobs, GUIs and customer programs, such as VB (virtual Basic). A second tier comprises application or FW servers using for example MTS/DCOM to communicate DCOM. A third tier includes a DB engine, such as Oracle using an ODB (open database connectivity) interface. All DFS/F components employ these three tiers, while common building blocks can be used in one or more of these tiers depending on the structure and function of the building block.

FW components are associated with various lifecycle activities of FALC 200. Representative examples of these associations are shown in Table IV.

TABLE V

| FW Components Associated With FALC 200 lifecycle activities | |
|---|---|
| FALC 200 lifecycle activity | FW Component |
| 220 | SC, GCC, PLMC, SMC |
| 230 | CRC, CMC, CC |
| 250 | VWC, RCC, EVMC, BRC |
| 260 | DMC |

Figure 7:
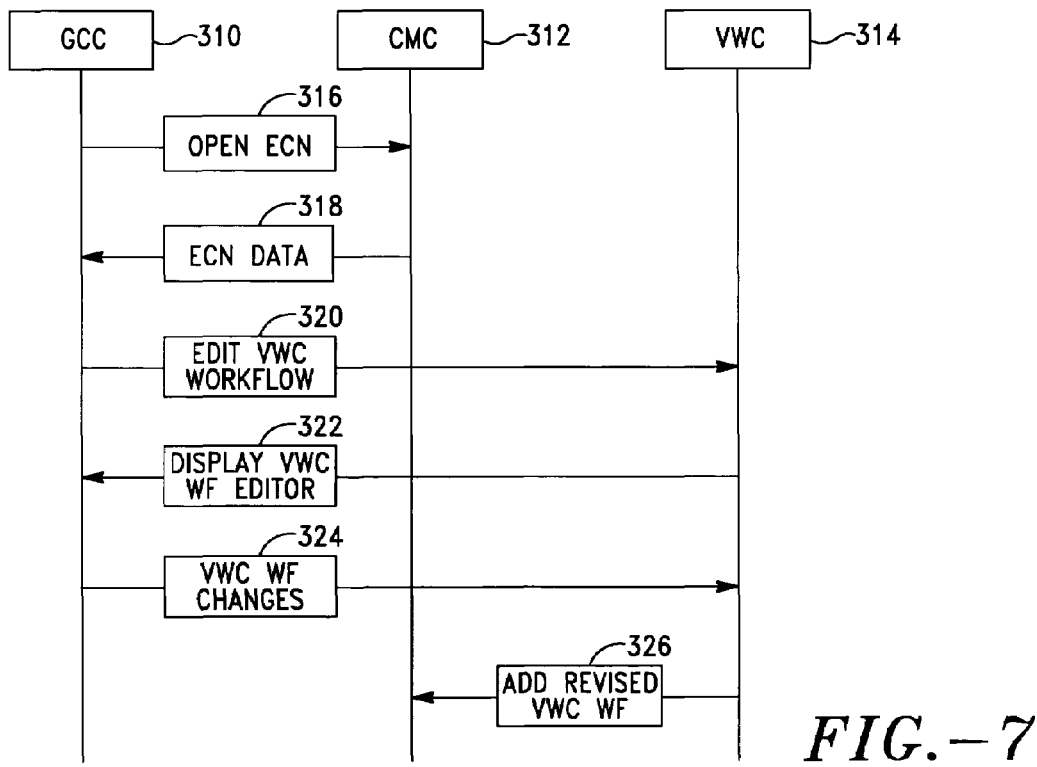
FIG. 7 is a schematic diagram illustrating interactions between framework components of the present invention.

FW components of an FALC of the present invention, such as FALC 200, are adapted for interacting with each other, thereby working together. For example, a factory model can be revised as illustrated in FIG. 7, by utilizing an exchange of messages between a GCC (GUI console component) 310, a CMC (configuration management component) 312 and a VWC (visual workflow component) 314. Changes in the factory model are collected to form an ECN (engineering change notice) in a CMC such as CMC 312 depicted in FIG. 7. The ECN is opened 316 (FIG. 7) to collect the changes in the factory model. The resulting ECN data 318 are employed by GCC 310 during the editing of the VWC workflow 320. The workflow is displayed and edited through a GUI 322 contained within GCC 310. The changed VWC workflow is returned to VWC in step 324, and VWC 314 then adds the changed workflow to the CMC ECN in step 326.

Figure 8:
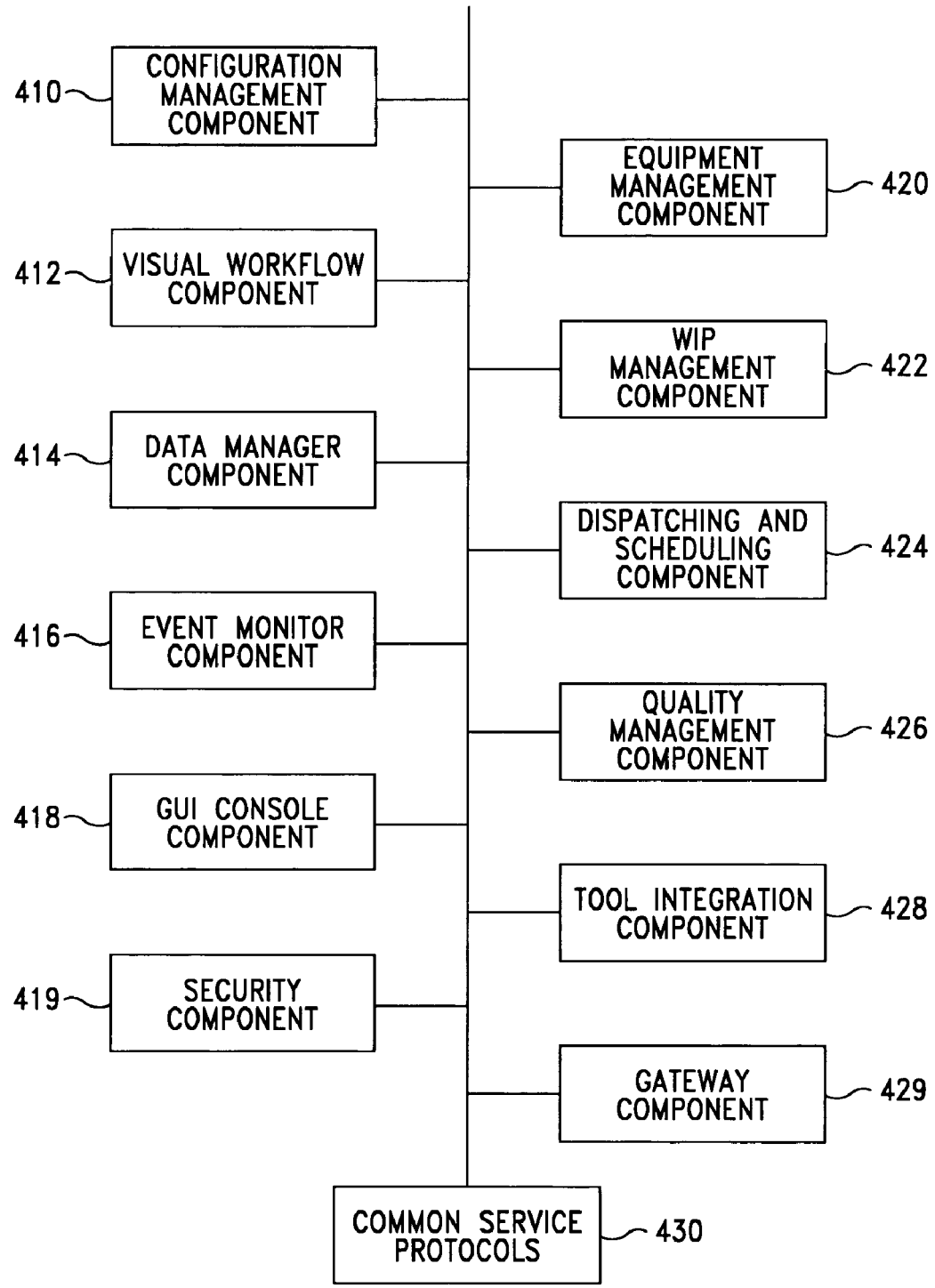
FIG. 8 is a block diagram schematically illustrating component servers of the present invention.

Any application component of the novel DFS/F can participate in the DFS/F by implementing the needed services from the appropriate FW components, thereby forming a plug and play type of SW framework, as is schematically illustrated in FIG. 8, employing FW or application servers working together through exchanges of messages. As shown in FIG. 8, FW components using FW component servers for CMC 410, VWC 412, DMC 414, EMC 416, GCC 418 and SC 419 use common service protocols to provide services to application components using application component servers for EMC 420, WMC 422, DSC 424, QMC 426, TIC 428 and gateway component 429. These services communicate through common service protocols 430 using for example DCOM communications. This SW technique of the present invention enables a user to modify processing and equipment MES instructions through data inputs rather than coding thus eliminating the need for time consuming programming changes requiring specialized skills. The application components require effective communications with integrated pieces of equipment such as wafer fab tools and materials handling equipment in order to execute the MES instructions to the controllers of wafer fab tools and/or other equipment. Typical controllers include processors for example micro processors such as on-board computers, computer operated software and mechanical/electrical controllers such as switches and electrical circuits employing for example a variable resistor such as a potentiometer.

DFS/F of the present invention includes a novel TIC application component (Table IV) for facilitating communications between various DFS/F components and equipment, such as wafer fab tools, by providing the basic equipment control building blocks which can be assembled in a VWC (Table III) workflow to control a machine. TIC provides services which include sending and receiving VFEI messages or commands to and from equipment. A sequence of these commands or messages represents a business logic such as commands to control a tool. These types of sequences can be defined in a VWC workflow. TIC provides the building blocks which are used to send commands or messages to a tool and to receive messages or information from the tool, and to communicate the received messages or information to other DFS/F components. TIC is part of the communications link between DFS/F and equipment such as wafer fab tools.

TIC of the present invention comprises a novel combination of a TIP (tool interface program) and a novel TIC adapter. TIP is provided for each machine or tool type to translate VFEI commands or messages to an interface, such as SECS, of a machine and its controls such as control SW. Equipment which is adapted for communicating with novel DFS/F will have a TIP instance, i.e. a SW process dedicated to the equipment, running as an intermediary between the equipment and the DFS/F. An example of a suitable communication protocol between a TIP instance for a machine and DFS/F is a VFEI on DCOM protocol. Additionally it is contemplated to provide a novel VFEI+ on DCOM protocol wherein VFEI+ will include enhancements for administration, for modeling and for the RPC (remote procedure call) nature of DCOM. It is contemplated to distribute TIP on several computers, for example where these computers are utilized in computer integrated wafer fab tools employing TIP SW.

A TIC adapter of the present invention is an intermediary between DFS/F and TIPs for example by allowing other DFS/F components to access tool capabilities through generalized commands which the adapter then adapts to the needs of the tool's specific TIP instances. This is illustrated in the following example for collecting measurements using a metrology tool in a wafer fab having different tools available for collecting the measurements. These novel techniques are adapted for embedding the collection process in a VWC WF which then enables a user, such as a process technician or engineer, to send identical measurement requests to TIC. The TIC adapter then translates the request into tool specific VFEI requests based on the particular tool which is selected at run time. These techniques of the present invention are capable of defining for example a single QMC (quality management component) data collection plan which can then be used for different tools collecting the same types of data, because the TIC adapter can translate the data parameter names from the generic name in the QMC plan to the specific names required by specific equipment types or tools.

Advantageously, a TIC adapter can also perform a protocol conversion between DFS/F style communications and the TIPs. This is a useful function because many DFS/F components are constructed using MTS and are designed to be transactional and stateless. For example, DFS/F servers both request and process services are either "synchronous", i.e. services that are expected to be completed within a predictably short completion time of one second or less, and services that are considered long running and that use an LRSP (long running service protocol). As defined herein, the term "long running service" includes services having a completion time which cannot be predicted and which are thus unsuitable for DB locking techniques which are typically employed in connection with conventional services, such as synchronous services. It is contemplated to process the service by an MTS based server using a relatively short lived MTS thread and wherein any longer term state is saved in a DB. It is also contemplated that service requests can be based on a DCOM RPC style model, where a service is requested which is then followed by a returned reply The TIC adapter is an intermediary between DFS/F and TIPs.

Figure 9:
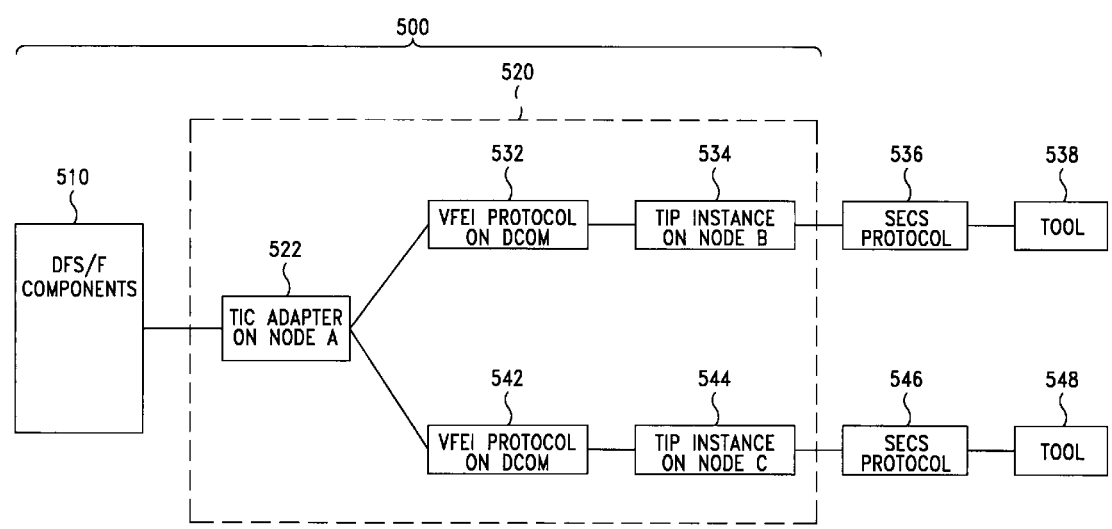
FIG. 9 is a block diagram schematically illustrating a tool integration component of the present invention.

An example of a novel TIC is illustrated in FIG. 9, showing a novel DFS/F 500 including TIC 520 of the present invention. In the present example, a distributed computer having nodes A, B and C was used. DFS/F components 510 communicated with fab tools 538 and 548 by means of TIC 520. MES instructions for tools 538 and 548 were sent by components 510 to novel TIC adapter 522 of TIC 520. For example, instructions for starting the processing of a material can be communicated from a DFS/F component 510, such as a VWC workflow, to tool 538 through TIC 520. The TIC adapter was accessed through an MTS server on node A. The instructions for tool 538 were communicated from TIC adapter 522, through a VFEI protocol on DCOM 532, to a TIP instance 534 on node B. TIP instance 534 then communicated these instructions to tool 538 using SECS protocol 536 of tool 538. Similarly, the instructions for tool 548 were communicated from TIC adapter 522 to a TIP instance 544 on node C, through a VFEI protocol on DCOM 542. TIP instance 544 communicated the instructions to tool 548 using SECS protocol 546 of tool 548. Also a DB (not shown) can be provided which can be accessed by TIC adapter 522 to store and retrieve TIC data such as the network locations of specific TIPs, using such methods and techniques as are well known to those of ordinary skill in the art.

TICs of the present invention employ Microsoft DCOM messaging technology to send messages between DFS/F components of the present invention and a TIC adapter, and between a TIC adapter and tool interface program instances according to the present invention. A TIC adapter is constructed using common building blocks of the present invention such as those described in Table II. An inventive TIC adapter can be constructed using a Microsoft transaction server. The adapter is capable of simultaneously managing messages from many DFS/F components and many TIP instances. A TIC adapter of the present invention is capable of saving information such as pending event requests, i.e. the instruction to a TIP regarding a request that a tool should report a particular status or operating event. The information can for example be saved using Oracle database technology using such techniques as are well known to those of ordinary skill in the art.

Figure 10:
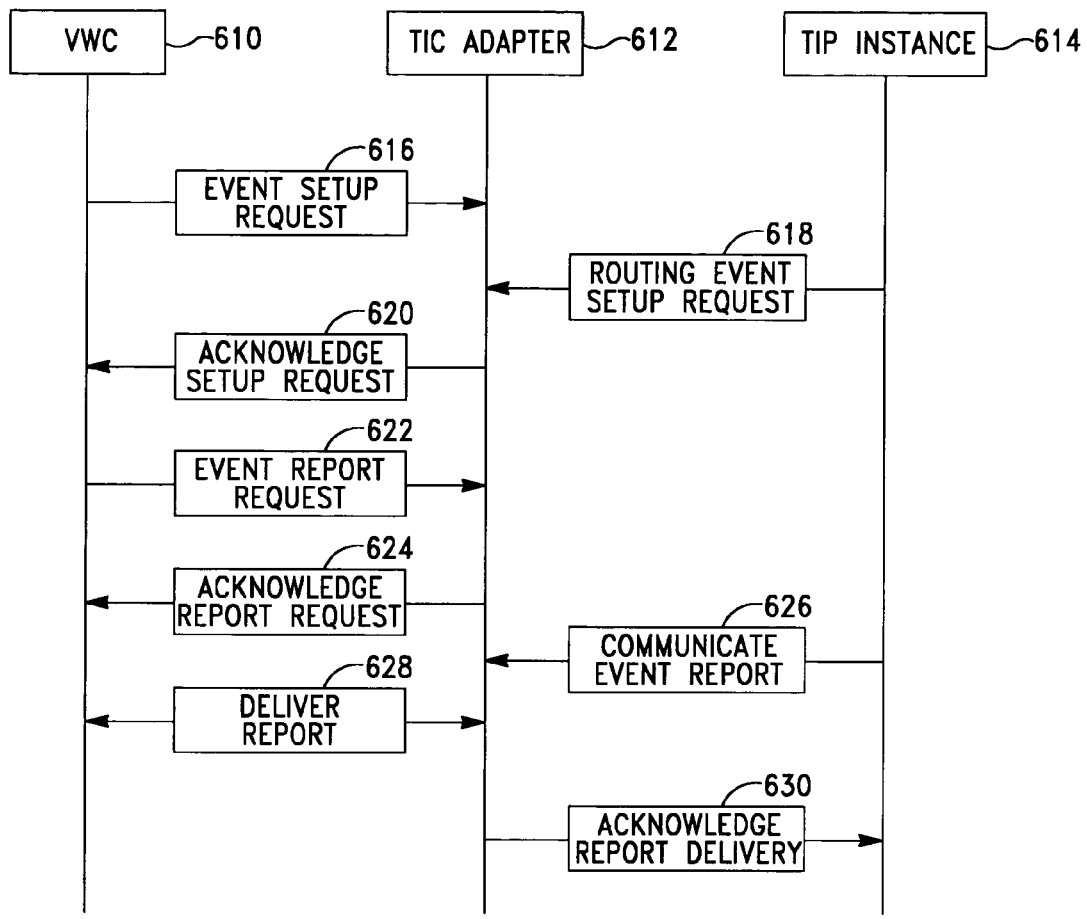
FIG. 10 is a schematic diagram illustrating a sequence of messages from a visual workflow component to a tool interface program of the present invention.

FIG. 10 shows a sequence of messages from a VWC 610 executing a business process which is defined in a VWC WF, to a TIC adapter 612 and then on to a TIP instance 614. This TIP instance includes a tool interface program for interfacing with processing equipment (not shown) such as a wafer fab tool for manufacturing an integrated circuit structure. The VWC business process sends an instruction to TIC adapter 612, requesting an event setup 616 which is a request for reporting an equipment event, for example reporting the completion of a wafer fabrication process. The event setup request is then routed 618 to TIP instance 614, which is subsequently acknowledged 620 to VWC 610. VWC then requests an event report 622 concerning the event setup request from TIC adapter 612. Event report request 622 is acknowledged in step 624. When the requested event occurs on the equipment, a report concerning the event is communicated 626 from TIP instance 614 to TIC adapter 612, which then checks to determine if there is a pending report request. When there is a pending report request, such as request 622, TIC adapter 612 delivers the requested report 628 to the VWC WF and acknowledges delivery 630 of the event report to TIP instance 614. Optionally, the VWC business WF can execute a loop requesting additional event reports. Once the requested reports are received from the tool, the loop terminates and VWC WF will send a concluding command to TIC to notify the tool, via its TIP, that the requested event reports should no longer be sent. It will be noted that TIP instance 614 might need a protocol such as SECS (not shown) in order to communicate with the equipment.

As shown in the above examples, application components such as TIC, communicate with and utilize FW components such as VWC (Table III). Additionally, a particular FW component can communicate with another FW component and utilize its services. For example, all FW components can use the common security FW component to regulate access to the services which these FW components provide, as is illustrated in FIG. 8.

Plug and play capabilities of a VWC are illustrated for example by WFs wherein the VWC is a technique for defining a business process as a WF which is subsequently executed as a job. WFs are graphical representations of business processes defined for manufacturing a product such as a semiconductor structure typically including many processing steps, equipment steps, movement steps, decision steps and data steps. Each of these steps is defined as a step in a WF. WFs can include movements, decisions, quality activities and equipment commands. WFs are built using drag and drop techniques in a computer graphical environment using techniques which are well known to those or ordinary skill in the art. Once defined, a WF is executed as a job. For example, a WF can be executed to create a lot of a product.

DFS/F of the present invention can be utilized to start production, such as a wafer fab run, by means of the WIP management application component (Table IV) as follows. A user, such as a process engineer, defines how a particular product is made by creating a WF in VWC that defines the sequence of steps needed to make the product. This sequence can for example include a wafer fab recipe. The user then starts the lot by using the WIP management application component service or GUI requesting VWC to start the WF for the lot. In summary, WIP uses VMC as a service for defining the processing steps and subsequently for actually manufacturing/fabricating production lots.

Building blocks provide common functionality to the novel DFS/F techniques to facilitate the construction of application and FW components. For example, a DFS/F classification building block (Table II) can be used in the EMC application component (Table IV) to classify equipment. It can also be used in the WIP management application component (Table IV) to classify products. This building block includes the three DFS/F tiers. A first tier uses a DFS/F GUI within the GCC to view and modify or update classification information. A second tier includes SW code/logic that is provided in the component server, such as EMC or WMC servers. This particular SW defines how the classifications are specified. For example, this SW enables a user to classify a particular wafer fab tool as an etcher. The classification building block SW is used in the component servers through for example a C++ inheritance capability, i.e. the capability to pass resources or attributes from component servers down to the specifics of a particular product, process or machine. A third tier comprises a DB table definition that is employed by the component server logic for storing and retrieving classification information.

Digitally coded data structures or information of novel DFS/F or its components and building blocks can be stored on a removable electronic data storage medium or device, such as computer floppy disks, removable computer hard disks, magnetic tapes and optical disks, to facilitate the use of the same technique at different processing locations. Alternatively, the data structure or information can be stored on a non-removable electronic data storage medium, including a medium positioned at a location which is remote from the tool, using such storage devices as are well known to those of ordinary skill in the art. The data structures or information can be communicated from a remote location to a central data processing unit or to a computer using communications techniques which are well known to those of ordinary skill in the art including hard wire connections, wireless connections and data communications methods utilizing one or more modems or techniques using one or more computers commonly known as servers. Once DSF/F or its components or building blocks are installed, they are commonly stored in a data storage device or memory of a dedicated computer or a distributed computer system which is integrated with the processing system and its equipment, using such data storage techniques as are well known to those of ordinary skill in the art.

It is contemplated to provide novel products comprising digitally coded data structures or information of novel DFS/F or its components or building blocks, stored in memory such as a removable electronic data storage medium or device. It is also contemplated to provide a novel computer integrated apparatus having a memory or data storage device for storage of electronic or digital data, a central processing unit or a computer, and processing equipment wherein DFS/F or its components or building blocks are stored in the data storage device.

The invention has been described in terms of the preferred embodiment. One skilled in the art will recognize that it would be possible to construct the elements of the present invention from a variety of means and to modify the placement of components in a variety of ways. While the embodiments of the invention have been described in detail and shown in the accompanying drawings, it will be evident that various further modifications are possible without departing from the scope of the invention as set forth in the following claims.

What is claimed is:

1. A method for defining a computer implemented factory automation lifecycle, the method comprising:
    a) installing and administrating lifecycle activity framework components;
    b) factory modeling lifecycle activity framework components; and
    c) manufacturing controlling, monitoring and tracking lifecycle activity framework components that include a visual workflow component configured to execute at least one manufacturing process and at least one business process.

2. The method of claim 1, wherein said administrating lifecycle activity framework components comprise a performance and license management component.

3. The method of claim 1, wherein said factory modeling lifecycle activity framework components comprise a configuration management component.

4. The method of claim 1, wherein said manufacturing controlling, monitoring and tracking lifecycle activity framework components comprise defining one or more framework components selected from a resource coordination component, an event monitor component and a bill of resources component.

5. The method of claim 1 additionally comprising a method for defining one or more analyzing of manufacturing results lifecycle activity framework components.

6. The method of claim 5, wherein defining one or more analyzing of manufacturing results lifecycle activity framework components comprises defining a data manager component.

7. The method of claim 5 additionally defining a method for defining interactions between the one or more manufacturing results lifecycle activity framework components and components selected from the group consisting of factory modeling lifecycle activity framework components.

8. The method of claim 1 additionally defining a software (SW) developing and integrating lifecycle activity.

9. The method of claim 1 additionally defining a manufacturing planning lifecycle activity.

10. The method of claim 1 wherein defining a factory automation lifecycle comprises defining a factory automation lifecycle for processing an integrated circuit structure.

11. The method of claim 1, wherein defining a factory automation lifecycle additionally comprises defining framework components such that the framework components are adapted for communicating with a tool integration component, wherein the framework components are selected from the group consisting of installing and administrating lifecycle activity framework components, factory modeling lifecycle activity framework components, and manufacturing controlling, monitoring and tracking lifecycle activity framework components.

12. An apparatus for processing a product, the apparatus comprising:
   a) product processing equipment;
   b) at least one central processing unit for electronic data processing;
   c) a link for operably linking the central processing unit to the product processing equipment;
   d) a memory for storing digitally coded data structures, wherein the memory is operably linked to the at least one central processing unit; and
   e) a digitally coded first data structure stored in the memory wherein the data structure comprises a factory automation lifecycle including:
      (1) administrating lifecycle activity framework components,
      (2) factory modeling lifecycle activity framework components, and
      (3) manufacturing, controlling and tracking lifecycle activity framework components that include a visual workflow component configured to execute at least one manufacturing process and at least one business process.

13. The apparatus of claim 12, wherein the administrating lifecycle activity framework components comprise a performance and license management component.

14. The apparatus of claim 12, wherein the factory modeling lifecycle activity framework components comprise configuration management component.

15. The apparatus of claim 12, wherein the manufacturing controlling and tracking lifecycle activity framework components comprise one or more framework components selected from a resource coordination component, an event monitor component and a bill of resources component.

16. The apparatus of claim 12 additionally comprising one or more analyzing of manufacturing results lifecycle activity framework components.

17. The apparatus of claim 16, wherein the one or more analyzing of manufacturing results lifecycle activity framework components comprise a data manager component.

18. The apparatus of claim 12 additionally comprising a digitally coded second data structure including application components, wherein the first data structure is adapted for managing the second data structure.

19. The apparatus of claim 18 additionally comprising a digitally coded third data structure including software building blocks for forming one or more of the framework components.

20. The apparatus of claim 12, wherein the first data structure comprises:
   a) a digitally coded fourth data structure including a graphical user interface (GUI) console component; and
   b) a digitally coded fifth data structure including a configuration management component.

21. The apparatus of claim 20, wherein the fourth and fifth data structures are adapted for interacting.

22. The apparatus of claim 12 wherein the link comprises a tool integration component including: (1) a tool integration component adapter and (2) a tool interface program.

23. The apparatus of claim 12 comprising an apparatus for processing an integrated circuit structure.

24. A data storage device comprising a digitally coded first data structure including a factory automation lifecycle having:
   a) administrating lifecycle activity framework components;
   b) factory modeling lifecycle activity framework components; and
   c) manufacturing controlling and tracking lifecycle activity framework components that include a visual workflow component configured to execute at least one manufacturing process and at least one business process.

25. The device of claim 24, wherein the administrating lifecycle activity framework components comprise a performance and license management component.

26. The device of claim 24, wherein the factory modeling lifecycle activity framework components comprise configuration management component.

27. The device of claim 24, wherein the manufacturing controlling and tracking lifecycle activity framework components comprise one or more framework components selected from a resource coordination component, an event monitor component and a bill of resources component.

28. The device of claim 24 additionally comprising one or more analyzing of manufacturing results lifecycle activity framework components.

29. The device of claim 28, wherein the one or more analyzing of manufacturing results lifecycle activity framework components comprise a data manager component.

30. The device of claim 24 comprising a plurality of framework components which are adapted for interacting with a graphical user interface (GUI) console framework component.

31. The device of claim 24 additionally comprising a digitally coded second data structure including application components, wherein the first data structure is adapted for managing the second data structure.

32. The device of claim 31 additionally comprising a digitally coded third data structure including software building blocks for forming one or more of the framework components.

33. The device of claim 32 wherein the first, second and third data structures are adapted for processing an integrated circuit structure.

34. A method for defining a computer implemented automation lifecycle of a factory, the method comprising the steps of:
   a) defining software components relating to a lifecycle activity framework for automating the factory comprising a plurality of wafer fabrication tools; and
   b) installing and controlling the defined software components that include a visual workflow component configured to execute at least one manufacturing process and at least one business process.

35. The method of claim 34, wherein the software components include a manufacturing execution system.

36. A computer implemented method of automating a factory for manufacturing semiconductor devices, the method comprising the acts of:
   a) developing and installing control software for automating the factory;
   b) modeling tools and manufacturing processes of the factory;
   c) generating a plan to manufacture one or more semiconductor devices;
   d) controlling, tracking and monitoring manufacture of the semiconductor devices according to the plan;
   e) analyzing manufacturing results, wherein at least one of acts a), b) and c) is modified based on the results; and
   f) constructing one or more framework components configured to allow a user to conduct acts a)–e), wherein said framework components include a visual workflow component.

37. The method of claim 36 further comprises the act of:
   g) allowing the one or more framework components to access features of the tools and manufacturing processes of the factory with one or more generalized commands.

38. The method of claim 37 further comprises the act of:
   h) providing an interface between the one or more framework components and the tools of the factory, wherein the providing the interface includes the act of:
   translating the one or more generalized commands to commands adapted to control one or more of the tools of the factory.

39. The method of claim 36 further comprising the act of: providing common service protocols among a plurality of components of the one or more framework components.

40. The method of claim 39 further comprising the act of: configuring the one or more framework components to be capable of including one or more of:
   a configuration management component;
   a data manager component;
   an event monitor component;
   a GUI console component; and
   a security component.

41. The method of claim 39 further comprising the act of: configuring a configuration management component to manage the act of (b) modeling tools and manufacturing processes of the factory.

42. The method of claim 39 further comprising the act of: providing a performance and license management component.

43. The method of claim 39 further comprising the act of: providing a data manager component to manage the act of e) analyzing manufacturing results, wherein at least one of acts a), b) and c) is modified based on the results.

44. The method of claim 39 further comprising the act of: providing an event monitor component to manage the act of d) controlling, tracking and monitoring manufacture of the semiconductor devices according to the plan.

45. The method of claim 39 further comprising the act of: providing a GUI console component to manage the acts of
   a) developing and installing control software for automating the factory and f) constructing one or more framework components configured to allow a user to conduct acts a)–e).

46. The method of claim 39 further comprising the act of: configuring the one or more framework components to be capable of including any one or more of:
   a configuration management component;
   a data manager component;
   an event monitor component;
   a GUI console component;
   a security component;
   a equipment management component; sample application
   a work-in-progress management component;
   a dispatching and scheduling component;
   a quality management component;
   a tool integration component; and
   a gateway component.

47. The method according to claim 36, wherein the visual workflow component is configured to execute at least one manufacturing process and at least one business process.

48. A computer implemented method of automating a factory for manufacturing semiconductor devices, the method comprising the acts of:
   constructing a software framework configured to conduct a plurality of lifecycle activities, wherein the lifecycle activities comprise:
   a) developing and integrating control software for automating the factory;
   b) installing and administrating the control software;
   c) modeling tools of the factory;
   d) generating a plan to manufacture semiconductor devices;
   e) controlling, tracking and monitoring manufacture of the semiconductor devices according to the plan; and
   f) analyzing manufacturing results, wherein at least one of acts a), c) and d) is modified based on the results.

49. The method of claim 48, wherein the act b) further comprises modeling manufacturing processes of the factory.

50. The method of claim 48 further comprises the act of:
   g) allowing the software framework to access features of the tools of the factory with one or more generalized commands.

51. The method of claim 50 further comprises the act of:
   h) providing an interface between the software framework and the tools of the factory, wherein the providing the interface includes the act of:
   translating the generalized commands to commands adapted to control one or more the tools of the factory.

52. The method of claim 48 further comprising the act of: providing common service protocols among a plurality of components of the software framework.

53. The method of claim 52 further comprising the act of: configuring the software framework to be capable of including one or more of:
   a configuration management component;
   a data manager component;

an event monitor component;
a GUI console component; and
a security component.

54. The method of claim 52 further comprising the act of:
configuring a configuration management component to manage the act of (b) modeling tools of the factory.

55. The method of claim 52 further comprising the act of:
providing a performance and license management component.

56. The method of claim 52 further comprising the act of:
providing a data manager component to manage the act of e) analyzing manufacturing results, wherein at least one of acts a), b) and c) is modified based on the results.

57. The method of claim 52 further comprising the act of:
providing an event monitor component to manage the act of d) controlling, tracking and monitoring manufacture of the semiconductor devices according to the plan.

58. The method of claim 52 further comprising the act of:
providing a GUI console component to manage the acts of a) developing and installing control software for automating the factory and f) constructing a software framework configured to allow a user to conduct acts a)–e).

59. The method of claim 52 further comprising the act of:
configuring the software framework to be capable of including any one or more of:
a configuration management component;
a data manager component;
an event monitor component;
a GUI console component;
a security component;
a equipment management component; sample application;
a work-in-progress management component;
a dispatching and scheduling component;
a quality management component;
a tool integration component; and
a gateway component.

60. The method according to claim 48, wherein the visual workflow component is configured to execute at least one manufacturing process and at least one business process.

61. A computer implemented system for automating a factory for manufacturing semiconductor devices, the system comprising:
a software framework configured to conduct a plurality of lifecycle activities, wherein the software framework comprises:
a) means for developing and integrating control software for automating the factory;
b) means for installing and administrating the control software;
c) means for modeling tools and manufacturing processes of the factory;
d) means for modeling manufacturing processes of the factory;
e) means for generating a plan to manufacture semiconductor devices;
f) means for controlling, tracking and monitoring manufacture of the semiconductor devices according to the plan; and
g) means for analyzing manufacturing results, wherein at least one of acts a), c) and d) is modified based on the results wherein said software framework includes a visual workflow component.

62. The system of claim 61 further comprising:
h) an interface configured to allow the software framework to access features of the tools of the factory with one or more generalized commands.

63. The system of claim 61 wherein the interface is configured to translate the generalized commands to commands adapted to control one or more the tools of the factory.

64. The system of claim 61 further comprising:
common service protocols among a plurality of components of the software framework.

65. The system of claim 64 the software framework to be capable of including one or more of:
a configuration management component;
a data manager component;
an event monitor component;
a GUI console component; and
a security component.

66. The system of claim 64 further comprising:
a configuration management component configured to manage the act of (b) modeling tools and manufacturing processes of the factory.

67. The system of claim 64 further comprising:
a performance and license management component.

68. The system of claim 64 further comprising:
a data manager component to configured to manage the act of e) analyzing manufacturing results, wherein at least one of acts a), b) and c) is modified based on the results.

69. The system of claim 64 further comprising:
an event monitor component configured to manage the act of d) controlling, tracking and monitoring manufacture of the semiconductor devices according to the plan.

70. The system of claim 64 further comprising:
a GUI console component configured to manage the acts of a) developing and installing control software for automating the factory and f) constructing a software framework configured to allow a user to conduct acts a)–e).

71. The system of claim 64 wherein the software framework is capable of including any one or more of:
a configuration management component;
a data manager component;
an event monitor component;
a GUI console component;
a security component;
a equipment management component; sample application;
a work-in-progress management component;
a dispatching and scheduling component;
a quality management component;
a tool integration component; and
a gateway component.

72. The system according to claim 61, wherein the visual workflow component is configured to execute at least one manufacturing process and at least one business process.

73. A computer readable medium for storing instructions being executed by one or more computers, the instructions directing the one or more computers for automating a factory for manufacturing semiconductor devices, the instructions comprising the acts of:
constructing a software framework configured to conduct a plurality of lifecycle activities, wherein the lifecycle activities comprise:
a) developing and integrating control software for automating the factory;
b) installing and administrating the control software;

c) modeling tools of the factory;
d) generating a plan to manufacture semiconductor devices;
e) controlling, tracking and monitoring manufacture of the semiconductor devices according to the plan; and
f) analyzing manufacturing results, wherein at least one of acts a), c) and d) is modified based on the results, wherein said software framework includes a visual workflow component.

74. The medium of claim 73, wherein the act b) further comprises modeling manufacturing processes of the factory.

75. The medium of claim 73 further comprises the instructions for the act of:
g) allowing the software framework to access features of the tools of the factory with one or more generalized commands.

76. The medium of claim 75 further comprises the instructions for the act of:
h) providing an interface between the software framework and the tools of the factory, wherein the providing the interface includes the act of:
translating the generalized commands to commands adapted to control one or more the tools of the factory.

77. The medium of claim 73 further comprising the instructions for the act of:
providing common service protocols among a plurality of components of the software framework.

78. The medium of claim 77 further comprising the instructions for the act of:
configuring the software framework to be capable of including one or more of:
a configuration management component;
a data manager component;
an event monitor component;
a GUI console component; and
a security component.

79. The medium of claim 77 further comprising the instructions for the act of:
configuring a configuration management component to manage the act of (b) modeling tools of the factory.

80. The medium of claim 77 further comprising the instructions for the act of:
providing a performance and license management component.

81. The medium of claim 77 further comprising the instructions for the act of:
providing a data manager component to manage the act of e) analyzing manufacturing results, wherein at least one of acts a), b) and c) is modified based on the results.

82. The medium of claim 77 further comprising the instructions for the act of:
providing an event monitor component to manage the act of d) controlling, tracking and monitoring manufacture of the semiconductor devices according to the plan.

83. The medium of claim 77 further comprising the instructions for the act of:
providing a GUI console component to manage the acts of a) developing and installing control software for automating the factory and f) constructing a software framework configured to allow a user to conduct acts a)–e).

84. The medium of claim 77 further comprising the instructions for the act of:
configuring the software framework to be capable of including any one or more of:
a configuration management component;
a data manager component;
an event monitor component;
a GUI console component;
a security component;
a equipment management component; sample application;
a work-in-progress management component;
a dispatching and scheduling component;
a quality management component;
a tool integration component; and
a gateway component.

85. The medium according to claim 73, wherein the visual workflow component is configured to execute at least one manufacturing process and at least one business process.

86. A method for defining a computer implemented factory automation lifecycle, the method comprising:
a) installing and administrating lifecycle activity framework components;
b) factory modeling lifecycle activity framework components; and
c) manufacturing controlling, monitoring and tracking lifecycle activity framework components that include a visual workflow component.

87. The method of claim 86, wherein said administrating lifecycle activity framework components comprise a performance and license management component.

88. The method of claim 86, wherein said factory modeling lifecycle activity framework components comprise a configuration management component.

89. The method of claim 86, wherein the visual workflow component is configured to execute at least one manufacturing process and at least one business process.

* * * * *